United States Patent
Smallridge

(10) Patent No.: US 8,234,227 B2
(45) Date of Patent: Jul. 31, 2012

(54) TIMESTAMP NEURAL NETWORK

(76) Inventor: Brad Smallridge, San Francisco, CA (US)

(*) Notice: Subject to any disclaimer, the term of this patent is extended or adjusted under 35 U.S.C. 154(b) by 661 days.

(21) Appl. No.: 12/416,855

(22) Filed: Apr. 1, 2009

(65) Prior Publication Data

US 2010/0257130 A1    Oct. 7, 2010

(51) Int. Cl.
*G06F 15/18*    (2006.01)
*G06F 3/00*    (2006.01)
(52) U.S. Cl. .......................................... 706/15; 710/58
(58) Field of Classification Search .................. None
See application file for complete search history.

(56) References Cited

U.S. PATENT DOCUMENTS

| | | | |
|---|---|---|---|
| 4,937,872 A | 6/1990 | Hopfield et al. | |
| 5,666,518 A | 9/1997 | Jumper | |
| 7,054,950 B2 | 5/2006 | Putzolu | |
| 7,174,325 B1 | 2/2007 | Ascoli | |
| 7,512,861 B2 * | 3/2009 | Brajovic | 706/20 |
| 2009/0150311 A1 * | 6/2009 | George | 706/12 |

* cited by examiner

*Primary Examiner* — Alan Chen

(57) ABSTRACT

A timestamp neural network comprised of sensor elements, internal elements, and motor elements is responsive to timestamps. Sensor elements transform a wide variety of signals into events that trigger the updating of timestamps. Internal elements are responsive to timestamps. Motor elements convert timestamps into useful output signals. A real time video pattern recognition system is implemented.

21 Claims, 18 Drawing Sheets

|  | T=0 | T=1 | T=2 | T=3 | T=4 | T=5 | T=6 | T=7 | T=8 |
|---|---|---|---|---|---|---|---|---|---|
| TIMESTAMP A | 0 | 0 | 2 | 2 | 2 | 2 | 2 | 2 | 2 |
| TIMESTAMP B | 0 | 0 | 0 | 3 | 3 | 3 | 3 | 3 | 3 |
| TIMESTAMP C | 0 | 0 | 0 | 0 | 0 | 5 | 5 | 5 | 5 |
| TIMESTAMP D | 0 | 0 | 0 | 0 | 4 | 4 | 4 | 4 | 4 |
| TIMESTAMP E | 0 | 0 | 0 | 0 | 0 | 0 | 6 | 6 | 6 |

FIG. 6A

|  | T=0 | T=1 | T=2 | T=3 | T=4 | T=5 | T=6 | T=7 | T=8 |
|---|---|---|---|---|---|---|---|---|---|
| TIMESTAMP A | 0 | 0 | 2 | 1 | 0 | 0 | 0 | 0 | 0 |
| TIMESTAMP B | 0 | 0 | 0 | 2 | 1 | 0 | 0 | 0 | 0 |
| TIMESTAMP C | 0 | 0 | 0 | 0 | 0 | 2 | 1 | 0 | 0 |
| TIMESTAMP D | 0 | 0 | 0 | 0 | 2 | 1 | 0 | 0 | 0 |
| TIMESTAMP E | 0 | 0 | 0 | 0 | 0 | 0 | 2 | 1 | 0 |

FIG. 6B

| ADDRESS | LABEL | BIT 35 | BIT 34 | BIT33:16 | BIT 15:0 |
|---|---|---|---|---|---|
| 00000 | nul | 0 | 0 | 0 | 0 |
| 00001 | A | ES=0 | 0 | YOLD=30 | TIMESTAMP=2 |
| 00002 | A | 0 | 0 | LINK1=20000 | BOND1=64 |
| 00003 | A | 0 | 0 | LINK2=00000 | BOND2=0 |
| 00004 | B | ES=0 | 0 | YOLD=32 | TIMESTAMP=3 |
| 00005 | B | 0 | 0 | LINK1=20000 | BOND1=64 |
| 00006 | B | 0 | 0 | LINK2=00000 | BOND2=0 |
| 00008 | C | ES=1 | 0 | YOLD=34 | TIMESTAMP=5 |
| 00009 | C | 0 | 0 | LINK1=20003 | BOND1=64 |
| 0000A | C | 0 | 0 | LINK2=00000 | BOND2=0 |
| ... | ... | ... | ... | ... | ... |
| 20000 | D | 0 | 0 | ACC=1 | TIMESTAMP=3 |
| 20001 | D | 0 | 0 | LINK1=20003 | BOND1=64 |
| 20002 | D | 0 | 0 | LINK2=00000 | BOND2=0 |
| 20003 | E | 0 | 0 | ACC=2 | TIMESTAMP=6 |
| 20004 | E | 0 | 0 | LINK1=00000 | BOND1=0 |
| 20005 | E | 0 | 0 | LINK2=00000 | BOND2=0 |
| ... | ... | ... | ... | ... | ... |

FIG. 7

| ADDR | LABEL | BIT 35 | BIT 34 | BITS 33:16 | BITS 15:0 |
|---|---|---|---|---|---|
| 00000 | nul | 0 | 0 | 0 | 0 |
| 00001 | A | ES=0 | 0 | YOLD=30 | TIMESTAMP=2 |
| 00002 | B | ES=0 | 0 | YOLD=32 | TIMESTAMP=3 |
| 00003 | C | ES=1 | 0 | YOLD=34 | TIMESTAMP=4 |
| ... | ... | ... | ... | ... | ... |
| 20000 | D | 0 | 0 | 0 | TIMESTAMP=5 |
| 20001 | D | CN=1 | RN=1 | LINK1=00001 | BOND=64 |
| 20002 | D | CN=1 | RN=1 | LINK2=00002 | BOND=64 |
| 20003 | D | CN=0 | RN=0 | LINK3=00000 | BOND=0 |
| 20004 | E | 0 | 0 | 0 | TIMESTAMP=6 |
| 20005 | E | CN=1 | RN=1 | LINK1=20000 | BOND=64 |
| 20006 | E | CN=1 | RN=1 | LINK2=00003 | BOND=64 |
| 20007 | E | CN=0 | RN=0 | LINK3=0 | BOND=0 |
| ... | ... | ... | ... | ... | ... |

FIG. 8

| STATE | MEM | ADDRESS | DATA1 | DATA2 |
|---|---|---|---|---|
| 14 | RD | READ | NA | LOCAL |
| 15 | RD | READ | LINK1 | BOND1 |
| 16 | RD | READ | LINK2 | BOND2 |
| 17 | RD | READ | LINK3 | BOND3 |
| 18 | RD | SENSOR | YOLD | TIMESTAMP |
| 19 | RD | LINK1 | NA | INCOMING |
| 20 | RD | LINK2 | NA | INCOMING |
| 21 | RD | LINK3 | NA | INCOMING |
| 22 | NA | NA | NA | NA |
| 23 | WR | SENSOR | YOLD | TIMESTAMP |
| 24 | NA | NA | NA | NA |
| 25 | RD | SENSOR | YOLD | TIMESTAMP |
| 26 | WR | WRITE | NA | LOCAL |
| 27 | WR | WRITE | LINK1 | BOND1 |
| 28 | WR | WRITE | LINK2 | BOND2 |
| 29 | WR | WRITE | LINK3 | BOND3 |
| 30 | WR | SENSOR | YOLD | TIMESTAMP |
| 31 | NA | NA | NA | NA |

FIG. 18

TIMESTAMP NEURAL NETWORK

CROSS-REFERENCE TO RELATED APPLICATIONS

Not Applicable

FEDERALLY SPONSORED RESEARCH

Not Applicable

SEQUENCE LISTING OR PROGRAM

VHDL Program in Specification

BACKGROUND

1. Field

This Application Pertains to the Field of Artificial Intelligence and to the Recognition of Temporal events derived from images, sounds, and a host of other sensory inputs.

2. Prior Art

Scientists, engineers, and researchers use Artificial Neural Networks (ANNs) to model the operation of biological neurons by way of mathematical simulations, electronic circuitry, or computer systems in order to create artificial systems useful in data processing, pattern recognition, and control theory.

Most, if not all, ANN systems have an input layer, a hidden layer, and an output layer. A series of input signals are applied to the input layer and then the output signals from the output layer results are compared to a training set. Weight multipliers between the input layer and the hidden layer and between the hidden layer and the output layer are adjusted incrementally for a better output match to the training set.

Once trained, the resulting output of an ANN system is determined solely upon the immediate vector of input signals. In other words, the output will be the same for any input vector regardless of the input vectors presented to the ANN previously.

There are a few attempts by scientists, engineers, and researchers to expand the operation of ANN systems by adding temporal variation. One way to make ANN systems responsive to temporal variations is to add circuitry to the front end of the inputs. In U.S. Pat. No. 4,937,872 (Hopfield), electronic circuitry was added to the ANN system to delay some inputs more than other inputs. In U.S. Pat. No. 5,666,518 (Jumper), inputs are modified by Gaussian shaped delay functions. These patents modify the inputs to represent time varying signals, but the core ANN system is fundamentally the same.

There are a few theories of what the pulses in biological neurons represent and how that should be modeled in a computer system. One theory is that a firing of a single neuron is significant and can be modeled by an electronic pulse. These systems are called Pulsed Neural Networks or Spiking Neural Networks. An example of a pulsed neural network is U.S. Pat. No. 7,174,325 (Ascoli), where pulses are reduced to digital signals of delay, amplitude, and duration (DAD). The effect of simulated distal versus proximal synaptic connection is investigated.

Other inventions use time to improve on the efficacy of the traditional ANN Network. In U.S. Pat. No. 7,054,850 B2 (Matsugu), pulses are used to broadcast a plurality of neural responses over a common bus, thus achieving a wiring efficiency, with each neural output having a particular time slice to occupy a common bus. The wiring efficiency, however, has nothing to do with what the neural network is processing. There is no mention of multiple sequential images.

None of the aforementioned prior art suggests the use of timestamps or the recording of the time that events happen, as the primary element that drives the neural network. Although pulses or spikes indicate time, they may not be the most efficient representation of a temporal event. Delay, amplitude, duration, and the shape of pulses may be insignificant to the time of the event. An objective of this invention is to describe a neural network that operates predominantly on timestamps.

SUMMARY

A timestamp neural network is an interconnection of sensor elements, internal elements, and motor elements. Sensor elements transform a wide variety of signals into events that trigger the storage of timestamps. Internal elements are responsive to timestamps. Motor elements transfer timestamps into useful output signals. One use of a timestamp neural network is a video pattern recognition system.

A sensor element takes signals from the real world and transforms them to a timestamp. A timestamp is a record of the time that an event happens. Such an event could be, for example, an analog signal crossing a predetermined threshold. The time that the analog signal crosses the predetermined threshold is recorded and outputs as a timestamp. A sensor element, by means of analog electronic circuitry, or by digital processing means, or by a combination of both analog electronic circuitry and digital processing means, reduces an input signal to a timestamp.

An internal element has no direct coupling to the real world and its function is completely defined by its timestamp inputs and its timestamp output. An internal element receives timestamps from sensor elements and/or from other internal elements and produces a timestamp output. An internal element updates its timestamp output when the timestamp inputs meet a certain criterion, usually requiring a certain number of timestamp inputs to be relatively recent.

A motor element translates the timestamps back into real world signals. A motor element has at least one timestamp input and by means of analog electronic circuitry, or by digital processing means, or by a combination of both analog electronic circuitry and digital processing means, outputs a signal responsive to the timestamp inputs.

A timestamp is different than an analog signal for at least two reasons. First, the timestamp records the time of an event rather than a quantity. Second, a timestamp jumps to a new value every time an event happens and never changes slowly, as an analog signal does.

An objective of this invention is to provide a network wherein the internal elements need not be connected to every single input as in a traditional Artificial Neural Network, thus reducing the number of connections and reducing the required amount of hardware or processing.

Another objective is to identify the essential foundation of the intelligence and learning ability of biological systems and model those essential elements with a simplified and efficient electronic hardware system or computer algorithm with comparable performance.

Another objective is to allow wider input vectors, such as video imagery, to be processed. Usually, a video frame with reasonable resolution is too wide a vector for most traditional neural networks. A timestamp neural network does not have this limitation.

Another objective of this invention is to provide a system that seamlessly integrates a plurality of sensory input types. The inputs to the timestamp artificial neural network can be of image, pressure, position, sound, temperature, or other source. All the inputs are translated into a temporal progression of timestamps. Once they are interpreted as timestamps they are treated equally. They can be learned together if the timestamps indicate that the temporal events occur repeatedly together. This objective makes the invention particularly suited for robotics because it can incorporate many types of sensor inputs.

Another objective is to build a system that works efficiently. All calculations are done with integers. The invention operates in real time. The invention has no multipliers. The system can operate on a desktop or laptop computer or on a small single board with an FPGA and memory.

Another objective is to build a machine vision system capable of visual object recognition or product defect detection in real time. However, since any analog or digital signal can be reduced to a sequence of temporal elements, the invention applies to a wide variety of sensor signals and applications including, but not limited to voice and sound recognition, robotics, and machine control.

DRAWINGS

Figures

FIG. 1 is a schematic of a small timestamp neural network.
FIG. 2 shows a video edge moving across three sensors.
FIG. 3A shows a sensor element means.
FIG. 3B shows another sensor element means.
FIG. 3C shows another sensor element means.
FIG. 3D shows another sensor element means.
FIG. 4A shows an internal element means.
FIG. 4B shows another internal element means.
FIG. 4C shows another internal element means.
FIG. 4D shows another internal element means.
FIG. 5 shows a digital system.
FIG. 6A is a table showing sustaining timestamps.
FIG. 6B is a table showing decaying timestamps.
FIG. 7 shows a memory organization for forward pointing links.
FIG. 8 shows a memory organization for backward pointing links.
FIG. 9A shows a three input internal element.
FIG. 9B shows two inputs connected to the same timestamp.
FIG. 9C shows the output of an internal element connected to its own input.
FIG. 9D shows a timestamp output looping backward to a prior internal element.
FIG. 9E shows several levels of interconnected internal elements.
FIG. 10 is a flowchart of the sensor element processing.
FIG. 11 is a flowchart continuation of the sensor element processing.
FIG. 12 is a flowchart continuation of the sensor element processing.
FIG. 13 is a flowchart of the internal element processing.
FIG. 14 is a flowchart continuation of the internal element processing.
FIG. 15 is a flowchart continuation of the internal element processing.
FIG. 16 is a flowchart continuation of the internal element processing.
FIG. 17 is a waveform of the VHDL signals.
FIG. 18 is a state machine table.

DETAILED DESCRIPTION

Glossary of Terms

Backward pointing—describing a link pointing from a timestamp input to a timestamp output.
Bond—a measure of the effectiveness of a link.
Chronoproximate—describing incoming timestamps that occur together.
CN—a field indicating that a link from an incoming timestamp is chronoproximate.
CP—an abbreviation for chronoproximate.
Decaying—describing a timestamp that diminishes over time.
Edge—a change in a pixel from one video frame to the next.
Forward pointing—describing a link pointing from a timestamp output to a timestamp input.
Incoming Timestamp—a timestamp from a link.
Internal Element—an element with timestamp inputs and a timestamp output.
Link—a coupling between a timestamp input and a timestamp output.
Local Timestamp—the timestamp of an internal element.
Mature—describing an undeletable link with high bond.
Motor Element—an element with timestamps inputs and a signal output.
Recent—describing a timestamp that is recently updated.
RUT list—a store of links that had Recently Updated Timestamps.
RN—a field indicating that an incoming timestamp is recent.
Sensor Element—an element connected to input signals.
Sustaining—describing a timestamp that does not change over time.
Tcount—a count of elements with recently updated timestamps.
Timestamp—a record of time.
Update—to store the current time into a timestamp.
YNEW—a pixel from the current video frame.
YOLD—the saved data form a pixel from a previous video frame.

Figure 1:
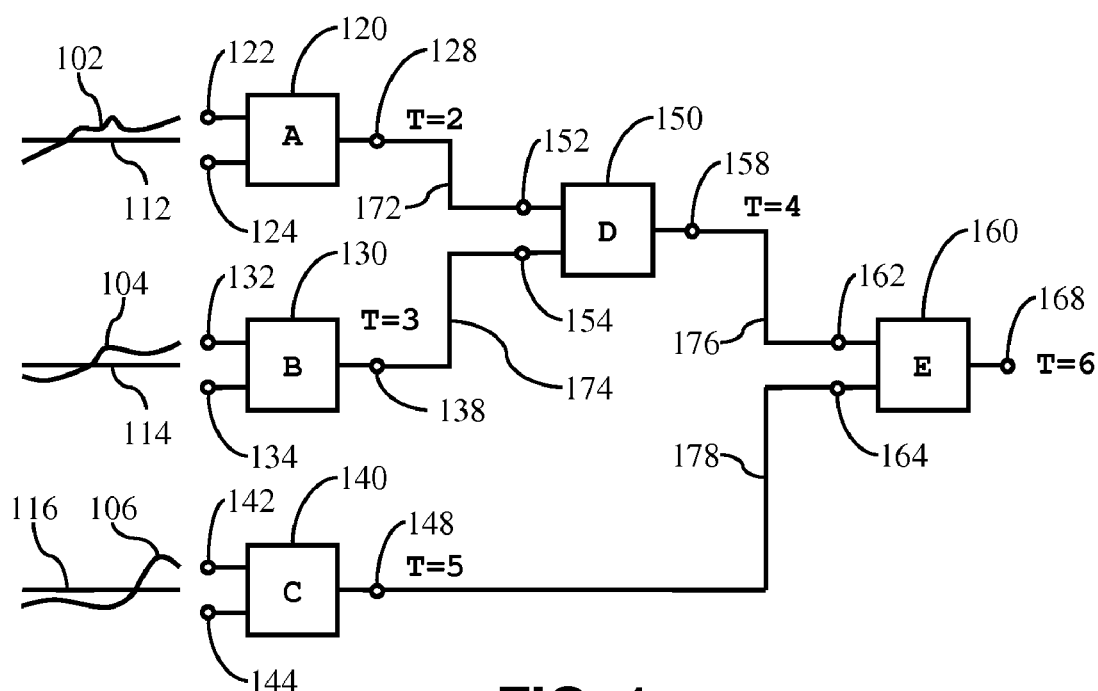
FIG. 1 schematically illustrates a small timestamp neural network including, among other things, three sensor elements 120, 130, and 140, and two internal elements 150 and 160.

Sensor element 120, which is labeled A, consists of analog input 122, threshold input 124, a timestamp (not shown), and a timestamp output 128. Analog signal 102 is drawn as a wiggly line. Threshold signal 112 is drawn as a straight horizontal line. Analog signal 102 crosses threshold signal 112. Analog signal 102 is coupled to analog input 122. Threshold signal 112 is coupled to threshold input 124.

Similarly, sensor element 130, which is labeled B, consists of analog input 132, threshold input 134, a timestamp (not shown), and a timestamp output 138. Analog signal 104 is drawn as a wiggly line. Threshold signal 114 is drawn as a straight horizontal line. Analog signal 104 crosses threshold signal 114. Analog signal 104 is coupled to analog input 132. Threshold signal 114 is coupled to threshold input 134.

Similarly, sensor element 140, which is labeled C, consists of analog input 142, threshold input 144, a timestamp (not shown), and a timestamp output 148. Analog signal 106 is drawn as a wiggly line. Threshold signal 116 is drawn as a straight horizontal line. Analog signal 106 crosses threshold 116. Analog signal 106 is coupled to analog input 142. Threshold signal 116 is coupled to threshold input 144.

Internal element 150, which is labeled D, consists of two timestamps inputs 152 and 154, a timestamp (not shown), and a timestamp output 158. Timestamp input 152 is coupled to timestamp output 128 by link 172. Timestamp input 154 is coupled to timestamp output 138 by link 174.

Internal element 160, which is labeled E, consists of two timestamps inputs 162 and 164, a timestamp (not shown), and a timestamp output 168. Timestamp input 162 is coupled to timestamp output 158 by link 176. Timestamp input 164 is coupled to timestamp output 148 by link 178.

FIG. 1 shows that an advantage of a timestamp neural network over a traditional artificial neural network is that a timestamp input can be connected to a timestamp output of either a sensor element, as illustrated by link 178, or an internal element, as illustrated by link 176.

Also shown in FIG. 1 are timestamp output values T=2, T=3, T=4, T=5, and T=6 of timestamp outputs 128, 138, 158, 148, and 168 respectively. These timestamp output values are a snapshot of the timestamp outputs after 6 time units have elapsed. How these timestamps arrive at these values is discussed below. The time unit of the timestamps is arbitrary. A time unit of one NTSC video field is convenient to some applications with an approximate duration of 16 ms.

Figure 2:
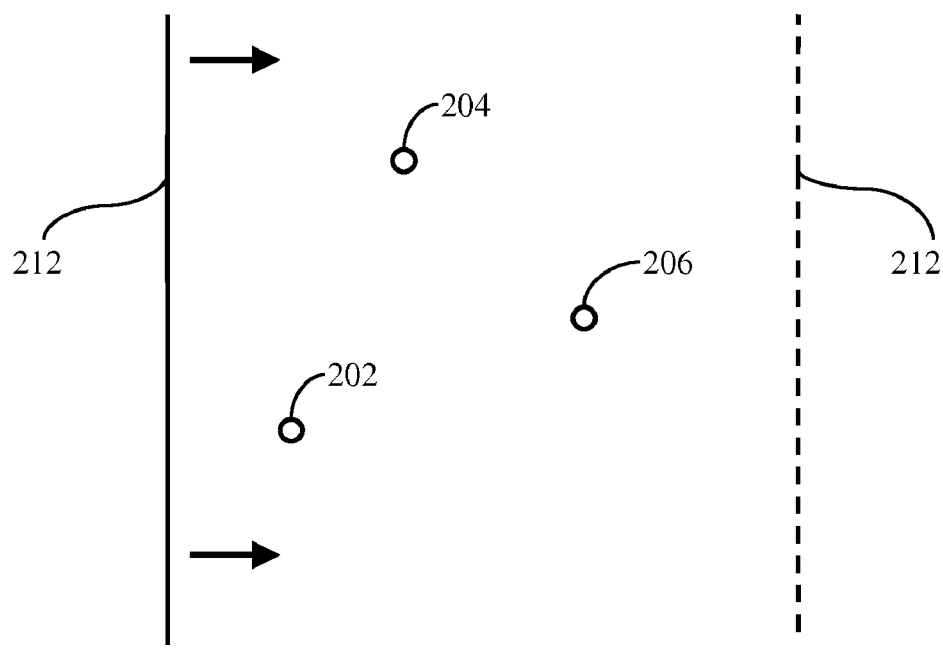

In order to illustrate how FIG. 1 operates, FIG. 2 shows an example physical arrangement of a video edge 212 moving from left to right, as indicated by the arrows, crossing over three photo sensors 202, 204, and 206, and arriving at location 212'. The photo sensors 202, 204, and 206 in FIG. 2 generate analog signals 102, 104, and 106, respectively in FIG. 1.

Video edge 212 could be generated by a moving object, a moving shadow, or a processed edge generated by an edge detector in a digital or analog system.

In FIG. 2 photo sensor 204 is above and slightly to the right of photo sensor 202. Photo sensor 206 is positioned to the right of both photo sensor 202 and photo sensor 204, slightly higher than photo sensor 202, and slightly lower than photo sensor 204. Photo sensors 202, 204, and 206 could be individual photo sensors or selected pixels of a sensor array.

The video edge 212 starts in the left position at T=0, then moves to the right at such a rate that it passes over sensor 202 at T=2, then over sensor 204 at T=3, and finally over sensor 206 at T=5. The threshold and function of the sensor elements 120, 130, and 140 in FIG. 1 results in timestamp outputs as indicated in FIG. 1. Sensor element 120 will have a timestamp T=2 at time 2. Sensor element 130 will have a timestamp T=3 at time 3. And sensor element 140 will have a timestamp T=5 at time 5. These timestamps will remain until another video edge passes over sensor elements 120, 130, or 140.

The timestamps of the internal elements update, in the example apparatus of FIG. 1, update when the timestamp inputs are temporally close together or chronoproximate. More specifically, in this example, the timestamps update when the timestamps inputs are within 2 time units. Internal element 150, labeled D, updates to T=4 when input 152 is T=2 and input 154 is T=3. Internal element 160, labeled E, updates to T=6 when input 162 is T=4 and input 164 is T=5.

A useful output from FIG. 1 can be obtained by connecting the timestamp output 168 to a pulse circuit that outputs only when the timestamp output changes, as one skilled in the art can construct. Internal element 160, labeled E, then becomes a motor element. With this output, the timestamp neural network of FIG. 1 can be used to indicate left to right movement. Such a device could be used to monitor the motion of people in an airport or to count fish swimming up a stream.

Sensor Element

Figure 3A:
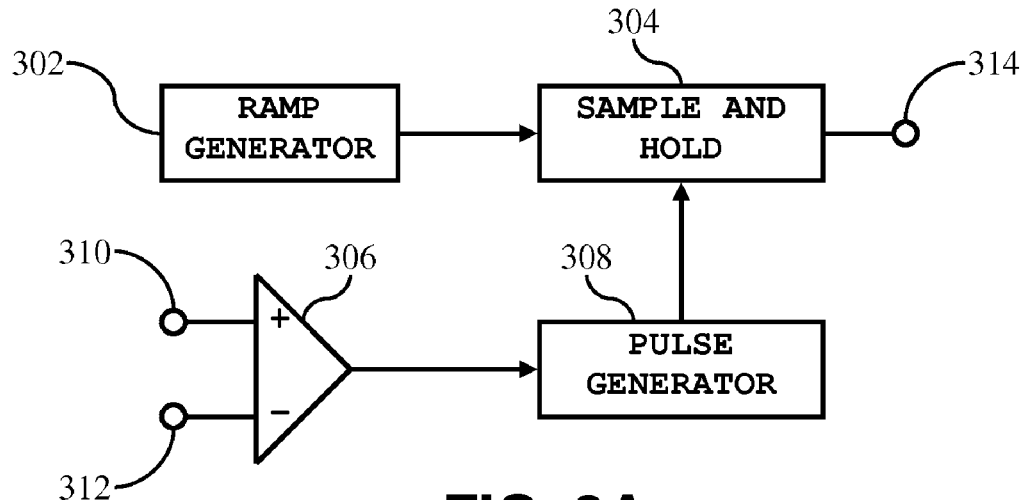
Figure 3B:
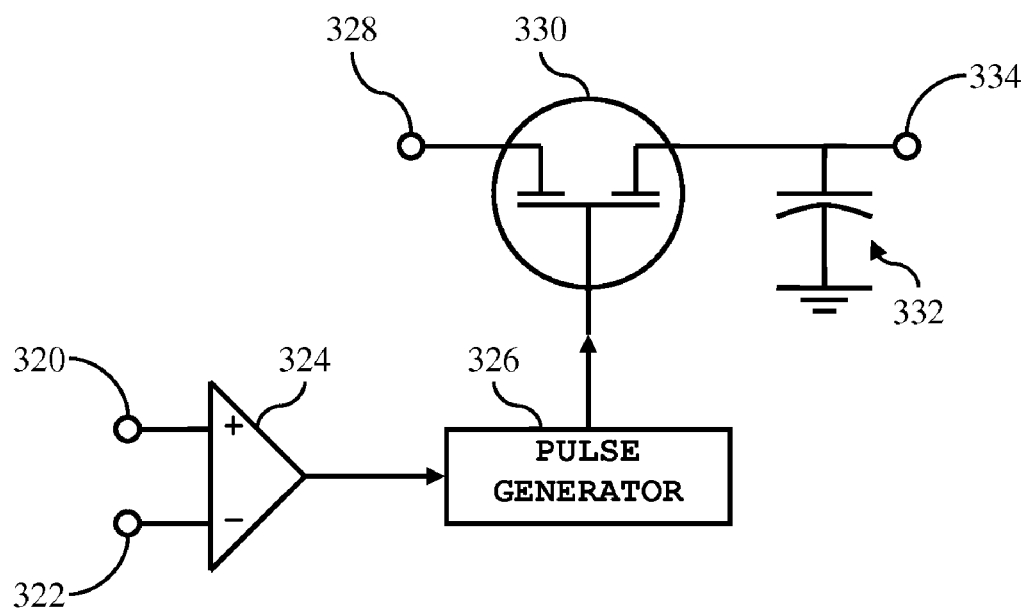
Figure 3C:
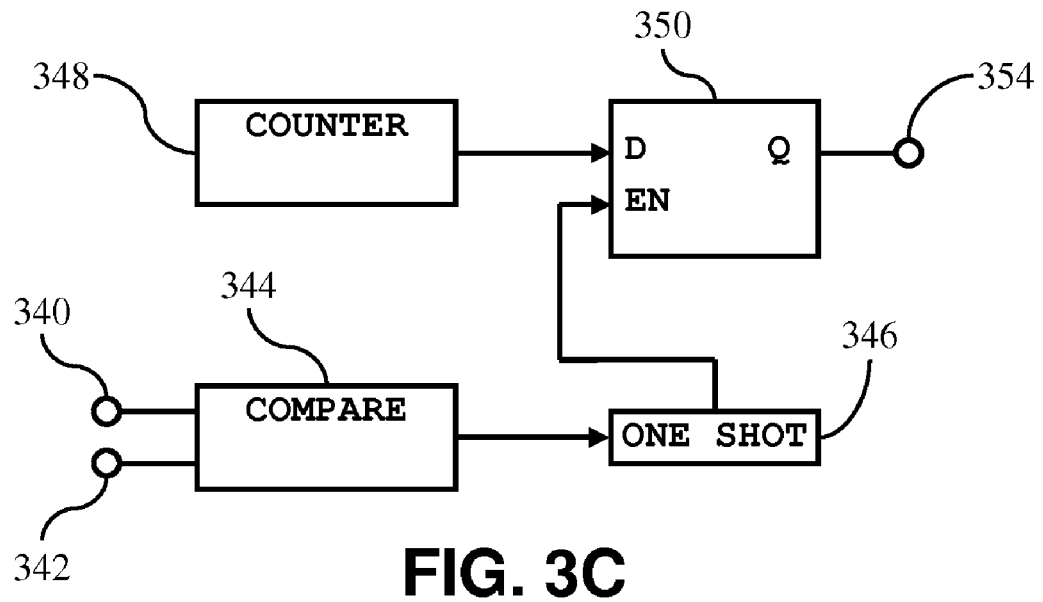
Figure 3D:
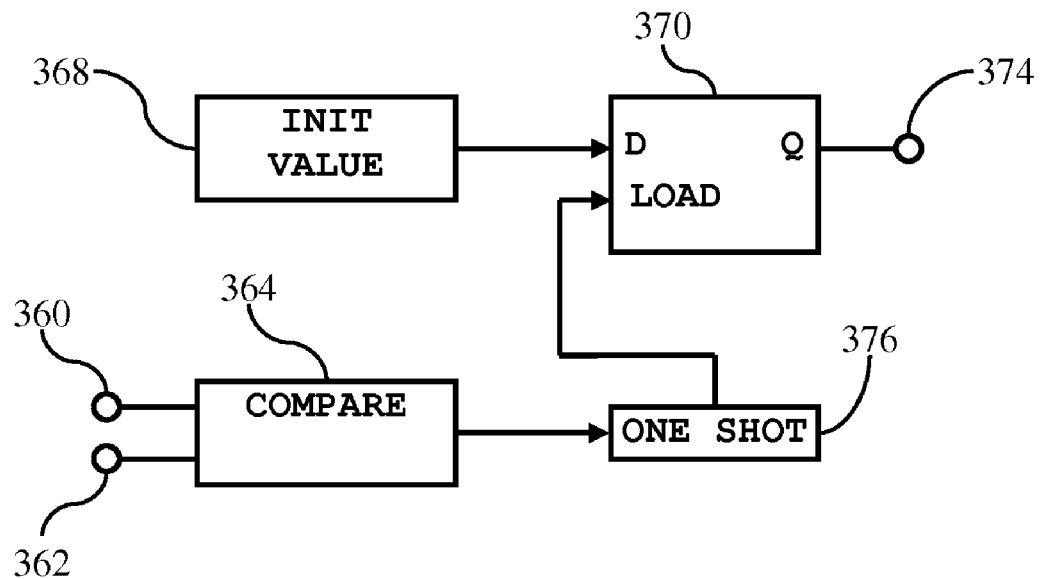

FIGS. 3A, 3B, 3C and 3D show various means to store and update a timestamp responsive to analog and threshold inputs for a sensor element. FIG. 3A and FIG. 3B show hardware analog circuits. FIG. 3C and FIG. 3D show digital hardware. Software means are also discussed.

FIG. 3A is an analog circuit including a ramp generator 302, a sample and hold 304, a comparator 306, and a pulse generator 308. The ramp generator outputs a ramp of gradually increasing signal which indicates the passage of time. The sample and hold circuit captures the ramp signal at timestamp output 314, when a pulse arrives at a trigger input. The bottom half of FIG. 3A triggers the event when the capture occurs. When analog input 310 exceeds the signal at threshold input 312, comparator 306 outputs a positive signal to pulse generator 308. Pulse generator 308 is monostable and when the signal at input 310 exceeds signal at threshold input 312 only one pulse is generated. Only one timestamp is captured until an event occurs wherein the signal at input 310 decreases below and later increases above the signal at threshold input 312. The timestamp output 314 stays constant until another event triggers the sample and hold and is called a sustaining timestamp output.

FIG. 3B is an analog circuit including a MOSFET device or analog switch 330, a capacitor 332, a comparator 324, and a pulse generator 326. The comparator 324 and pulse generator 326 operate similarly to FIG. 3A. When the signal at analog input 320 exceeds the signal at threshold input 322, the comparator 324 outputs a suitable signal to the pulse generator 326, the pulse generator 326 outputs a suitable pulse to the gate of MOSFET device or analog switch 330, forcing the MOSFET device or analog switch 330 to conduct, whereby a predetermined voltage at input 328 charges capacitor 332. After the pulse has subsided and the MOSFET device or analog switch 330 becomes non conductive, capacitor 332 discharges either through leakage current or through a resistor (not shown). The voltage across the capacitor represents time and is a decaying timestamp output 334, that is, as time goes on, the voltage becomes less and less until it is gone.

FIG. 3C illustrates a digital means for storing and updating a timestamp including digital compare 344, one shot 346, counter 348, and register 350. When a digital signal at digital input 340 exceeds the digital signal at digital threshold 342, the digital compare 344 outputs a signal to one shot 346. In response, one shot 346 outputs a pulse one clock period long to the enable input of register 350. Register 350 then captures the output of counter 348. Counter 348 is periodically counting and the output of counter 348 is therefore a representation of time. The output of register 350 is sustaining timestamp output 354.

FIG. 3D illustrates another digital means for storing and updating a timestamp including digital compare 364, one shot 376, and counter 370. Counter 370 loads an initialization value 368 or counts downward to zero. When a digital signal at digital input 360 exceeds the digital signal at digital threshold 362, the digital compare 364 outputs a signal to one shot 376. One shot 376 outputs a pulse one clock period long to the load input of counter 370. Counter 370 then loads initialization value 368 and begins to count down. The output of counter 370 is decaying timestamp output 374.

In FIG. 1, FIG. 3A, FIG. 3B, FIG. 3C, and FIG. 3D, the threshold input is understood in its broadest interpretation and is not restrictive to the invention. There are many ways to create an event to trigger the update of a timestamp. One example is that the threshold need not be constant. The threshold could be a floating average of either the input signal itself, or of another signal, or of many signals.

Another example is where the threshold input may be replaced by an input similar to the existing input creating a two input sensor element. A two input sensor element may be designed that updates a timestamp every time one input exceeds the other input. Alternatively, a two input sensor element may be designed that updates a timestamp whenever the absolute value of the difference of the input signals exceeds a threshold. A design such as this is described later in the video recognition specifications.

Threshold inputs 112, 114, and 116, may also be considered part of sensor elements 120, 130, and 140, respectively, if the threshold is constant and held internally to sensor elements 120, 130, and 140, as for example, in a digital processing system where a digitized input signal would be compared to an immediate threshold value, or, as another example, in an analog system wherein each sensor element has its own threshold voltage reference source.

Internal Element

Figure 4A:
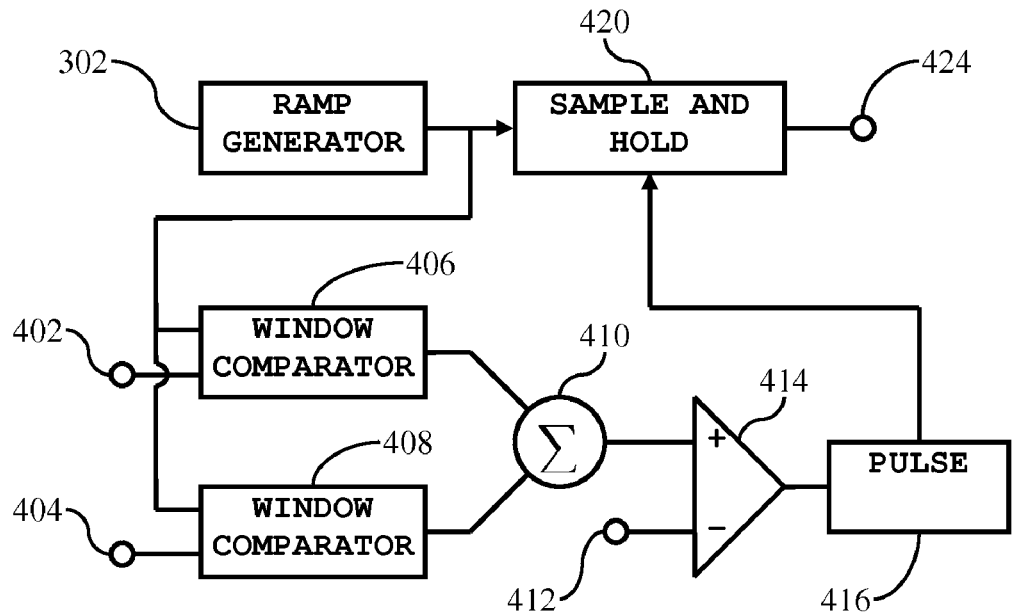

FIG. 4A illustrates an analog means to store and update a timestamp for an internal element including two window comparators 406 and 408, a summation circuit 410, a comparator 414, a pulse generator 416, a sample and hold 420, and a ramp generator 302. The ramp generator is ideally the same used in the equivalent means for sensor elements of FIG. 3A. When timestamp input 402 is near the ramp generator output, window comparator 406 outputs a suitable signal to summation circuit 410. Likewise, when timestamp input 404 is near the ramp generator output, window comparator 408 outputs a suitable signal to summation circuit 410. When summation output exceeds threshold input 412, comparator 414 outputs a suitable signal to pulse generator 416. Pulse generator 416 triggers sample and hold 420. Sample and hold 420 captures ramp generator output and outputs a sustaining timestamp 424.

Generally, when the timestamp inputs are near the time represented by the ramp generator, the time is sampled and held as a timestamp output. When this occurs, the timestamp inputs are chronoproximate.

Figure 4B:
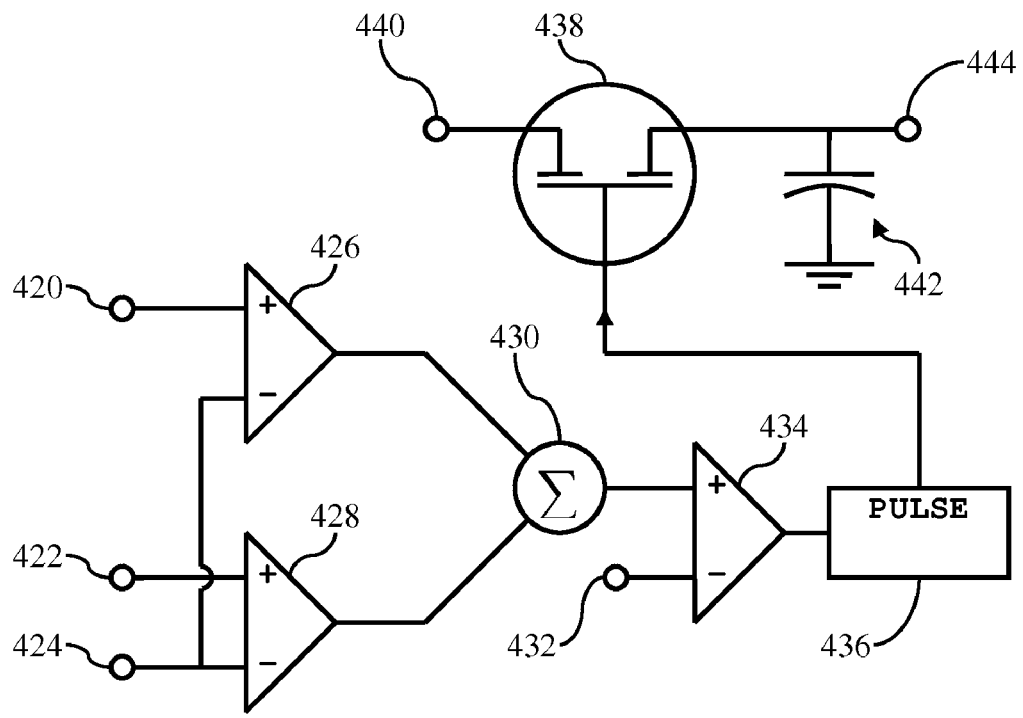

FIG. 4B illustrates another means to store and update a timestamp for an internal element including three comparators 426, 428, and 434, summation circuit 430, pulse generator 436, device 438, and capacitor 442. When analog input 420 exceeds analog threshold 424, comparator 426 outputs a suitable signal to summation circuit 430. Likewise, when analog input 422 exceeds analog threshold 424, comparator 428 outputs a suitable signal to summation circuit 430. When output of summation circuit 430 exceeds threshold signal 432, comparator 434 outputs a suitable signal to pulse generator 436. Pulse generator 436 triggers the gate of MOSFET device or analog switch 438 allowing the voltage 440 to charge capacitor 442. Decaying timestamp output 444 is the voltage across capacitor 442 which decays by leakage current or through a resistor (not shown). When analog decaying timestamps are used, the timestamp inputs are chronoproximate when both have voltage.

Figure 4C:
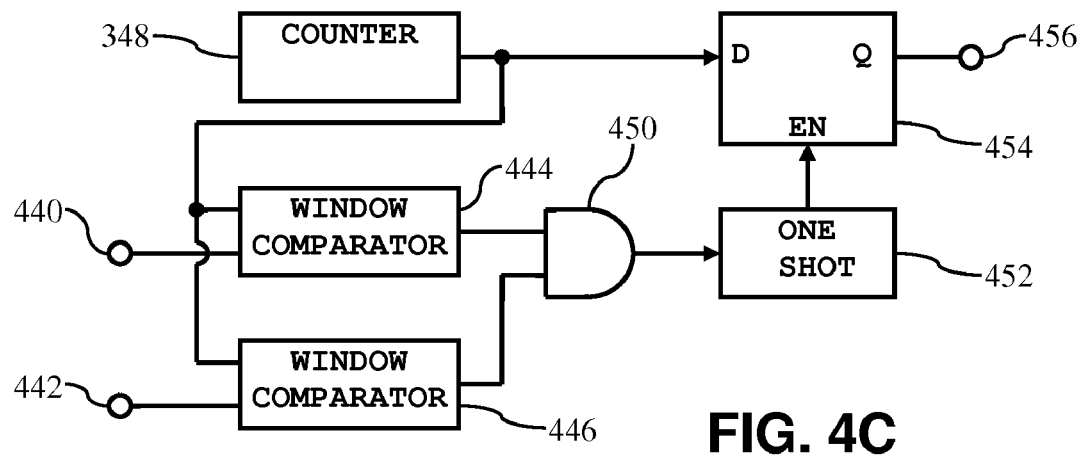

FIG. 4C illustrates a digital means to store and update a timestamp for an internal element including two window comparators 444 and 446, an AND gate 450, a one shot 452, a register 454, and a counter 348. The counter is ideally the same used in the equivalent means for sensor elements of FIG. 3C. When timestamp input 440 is near the counter 348 output, window comparator 444 outputs a binary 1 to AND gate 450. Likewise, when timestamp input 442 is near the counter 348 output, window comparator 446 outputs a binary 1 to AND gate 450. The output of AND gate 450 connects to one shot 452. One shot 452 triggers register 454 capturing the output from counter 348. The output of register 454 is a sustaining timestamp output 456. Generally, when the timestamp inputs are near the time represented by the counter, they are chronoproximate, and the time is captured and outputted as a digital sustaining timestamp output.

Figure 4D:
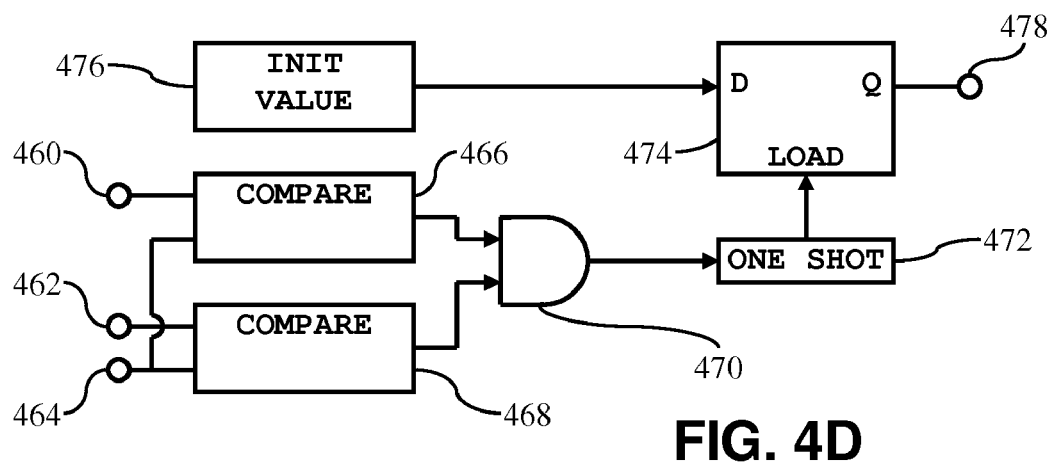

FIG. 4D illustrates another digital means to store and update a timestamp for an internal element including two compares 466 and 468, AND gate 470, one shot 472, and counter 474. When timestamp input 460 exceeds threshold input 464, compare 466 outputs a binary one to AND gate 470. Likewise, when timestamp input 462 exceeds threshold input 464 then compare 468 outputs a binary output to AND gate 470. When both inputs to the AND gate 470 are binary one, the AND gate 470 outputs a binary one to one shot 472. One shot 472 then triggers counter 474 to load an initialization value 476. Counter 474 then down counts to zero. The output of counter 474 is a digital decaying timestamp output 478.

In FIG. 4A, FIG. 4B, FIG. 4C, and FIG. 4D, all internal elements described have only two timestamp inputs. Generally, internal elements have any number of timestamp inputs. If there are more than two timestamp inputs, the timestamp output updates when a predetermined percentage of timestamp inputs are chronoproximate.

FIG. 6A and FIG. 6B further illustrate the difference between sustaining timestamp and decaying timestamp method. FIG. 6A shows a sustaining timestamp in digital format. For example at T=5, TIMESTAMP C becomes 5 and stays at 5 until some future update event (not shown). FIG. 6B, on the other hand, shows a decaying timestamp method in digital format. At T=5, TIMESTAMP C becomes 2 and then proceeds to count down to zero at T=7. Both sustaining timestamps and decaying timestamps can be used to store and update timestamps.

One skilled in the art could replace the down counting counters in FIG. 3D and FIG. 4D with up counting counters that stop a predetermined count. Whether up counting counters or down counting counters are used to implement the means of a decaying timestamp does not reduce the efficacy of the invention. Similarly, the discharging capacitor in the analog circuits shown in FIG. 3B and FIG. 4B, can be replaced by a capacitor that charges up to a rail voltage.

Processing Unit

Figure 5:
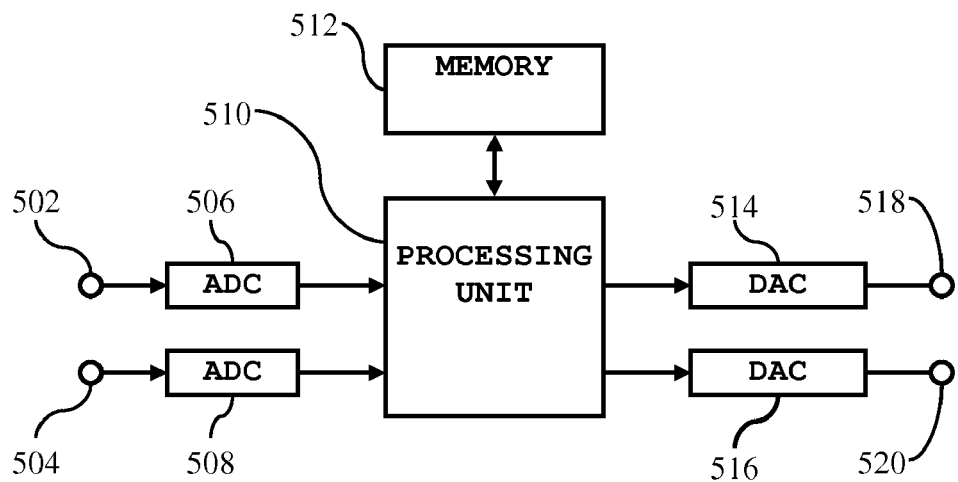

FIG. 5 illustrates yet another means to store and update timestamps using a digital processing system including two analog to digital converters 506 and 508, a processing unit 510, a memory 512, and two digital to analog converters 514 and 516. Analog signals 502 and 504 are connected to analog to digital converters 506 and 508 respectively. The analog to digital converts convert the analog signals to digital signals which then connect to the processing unit 510. The digital processing unit 510 reads data from digital memory 512, manipulates data, writes data to digital memory 512, inputs digital signals from analog to digital converters 506 and 508, and outputs data to digital to analog converters 514 and 516. Digital to analog converters 514 and 516 input digital signals, convert them, and output analog signals to analog outputs 518 and 520, respectively.

The exact number of analog to digital converters is not restrictive to the invention. There could be more or less than the two analog to digital converters shown in FIG. 5. It is foreseeable that there are no analog to digital converters if data has been previously been stored on another machine or at a previous time. Also, there could be no analog to digital converters required if digital information comes directly from a digital machine such as a target digital system bus or a digital data transmission. The number of digital to analog converters is also unrestrictive to the invention.

Associated with FIG. 5 are two memory organization schemes that can be used. FIG. 7 shows a memory organization with forward pointing links. FIG. 8 shows a memory organization with backward pointing links. Both forward pointing links and backward pointing links can couple timestamp inputs to timestamp outputs.

Forward Pointing Links

FIG. 7 illustrates a memory with a number of addresses. The numbers are in hex format. A sensor element is stored with three consecutive memory addresses. Each address has a 36 bit word that is divided into fields. The division depends on the address. For example, at address 00001 there are three fields ES, YOLD, and TIMESTAMP. The TIMESTAMP field stores the timestamp for a sensor element, in this case, equal to 2. The next two addresses, 00002 and 00003, are divided up into LINK and BOND fields. The LINK field indicates to where the sensor element output is coupled. LINK1=20000 indicates that the sensor element output is coupled to the internal element at address 20000. LINK2=00000 indicates that the sensor element output is not connected elsewhere. Addresses 00001, 00002, and 00003 are labeled A, signifying the data at these three addresses, define Sensor A. The link data if FIG. 7 reflects all the connections shown in FIG. 1. Sensor element A is connected to internal element D, sensor element B is connected to internal element D, sensor element C is connected to internal element E, and internal element D is connected to internal element E.

The ACC field at addresses 20000 and 20003 is necessary for forward pointing links to accumulate the number of links that have recently updated timestamps. As the elements are processed, if a timestamp is non zero, the ACC pointed to by the forward pointing link is incremented. If the ACC exceeds a predetermined threshold, the timestamp is updated. The ACC field can be periodically decremented to reduce sporadic updating. The ES, YOLD, and BOND fields are discussed subsequently.

Backward Pointing Links

FIG. 8 illustrates a memory organization with backward pointing links. The sensor elements each occupy only one address, as compared to three addresses in FIG. 7. Each address contains fields ES, YOLD, and TIMESTAMP. The sensor elements have no links. Instead the internal elements have backward pointing links from their inputs back to the connecting outputs. Address 20000, 20001, and 20002 depict internal element D with a timestamp equal to 5. At address 20001, LINK1=00001 indicates that the first input of element D connects to sensor A output at address 00001. At address 20002, LINK2=00002 indicates that the second input of element D connects to sensor B output at address 00002. At address 20003, LINK3=00000 indicates an empty or unused link.

Each internal element has a local timestamp and a number of associated incoming timestamps. The local timestamp is the timestamp that is updated by the internal element and is also coupled to the timestamp output. The incoming timestamps are the timestamps of other internal elements or sensor elements that are pointed to by the links. For example, the local timestamp for internal element E is stored at address 20004 in FIG. 8 whereas the incoming timestamps for internal element E are stored at addresses 20000 and 00003.

Both forward pointing links as depicted in FIG. 7 and backward pointing links as depicted in FIG. 8 can represent the link connections shown in FIG. 1 as well as a wide variety of other much more complex networks. Forward pointing links are more obvious and intuitive than backward pointing links. However, each means has its advantages.

FIG. 7 and FIG. 8 illustrate how links can be made on a computer system. Links can also be made for an analog system as shown in FIG. 3A, FIG. 3B, FIG. 4A, and FIG. 4B, with a variety of means including wires, printed circuit boards, chemical etching, laser etching, or programmable analog switches. Links can also be made for a hardware digital system as shown in FIG. 3C, FIG. 3D, FIG. 4C and FIG. 4D with a variety of means including wires, printed circuit boards, chemical etching, laser etching, or programmable digital gates as in an FPGA (Field Programmable Gate Array).

Figure 9A:
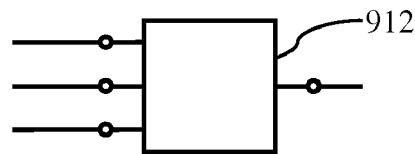
Figure 9B:
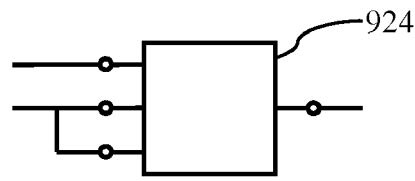
Figure 9C:
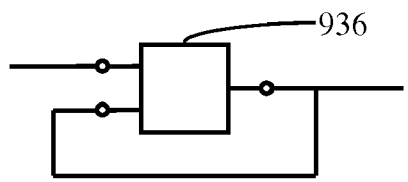
Figure 9D:
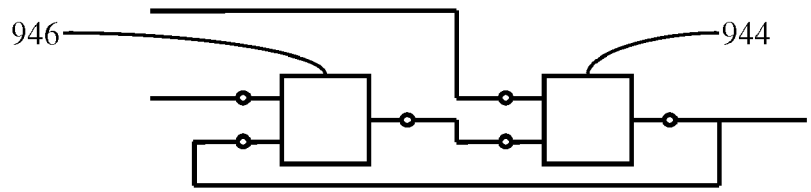
Figure 9E:
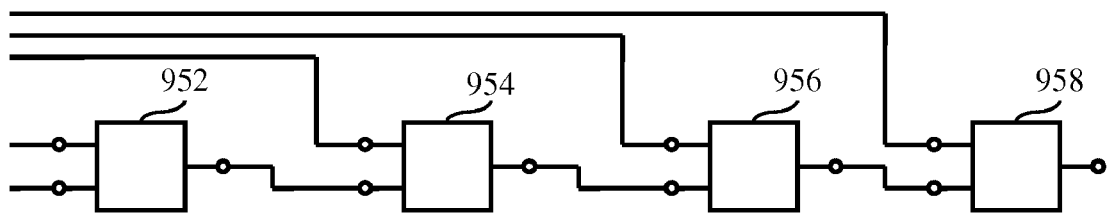

FIG. 9A through FIG. 9E show internal elements 912, 924, 936, 944, 946, 952, 954, 956, and 958 with various internal element connections that are possible with the means described thus far. FIG. 9A shows a three input internal element. An internal element can have any number of inputs. FIG. 9B shows two inputs of an internal element tied together, a possibility that may or may not be desired. FIG. 9C shows an input of an internal element connected to its own output, another possibility that may or may not be desired. FIG. 9D shows a two element feedback loop. FIG. 9E shows that the number of chained internal elements is not limited which is a feature not present in many tradition artificial neural networks.

Flowcharts

Figures FIG. 10 through FIG. 16 show flowcharts of a video recognition system using timestamp storing and updating. Timestamps for sensor elements are updated when a pixel from the current video frame YNEW significantly changes from the same pixel in the previous video frame YOLD. Decaying timestamps are used for both sensor elements and internal elements. The internal elements have backward pointing links. In addition, a method of creating and deleting links in response to bonds is described which provides the capacity to learn.

Figure 10:
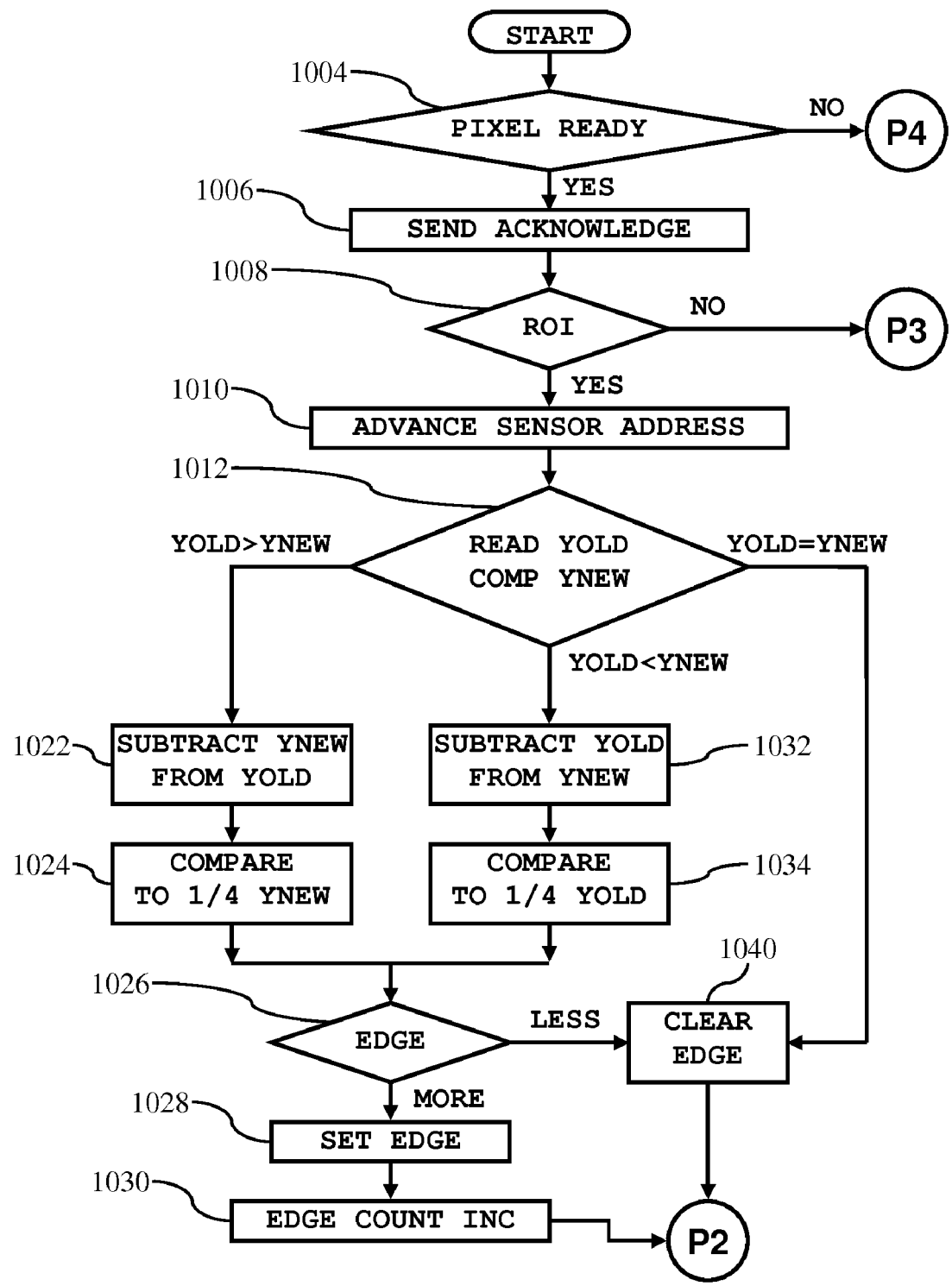

FIG. 10 is a flowchart of the sensor element process. All memory and variables are zeroed before any processing begins. Beginning with START the sensor element process must first determine if a pixel is ready for processing. This step is necessary if the digital processing is operating at a higher clock rate than the video stream which is normally the case. At decision PIXEL READY 1004 such a determination is made. If the pixel is ready, an acknowledge signal is sent in block SEND ACKNOWLEDGE 1006 to the asynchronous FIFO or other device supplying the pixel stream to signal that the next pixel should be readied. If a pixel is not ready, processing continues to page connector P4.

If the row and column of the pixel belong to a region of interest at decision ROI 1008, then processing continues to block ADVANCE SENSOR ADDRESS 1010. If the pixel does NOT belong to the region of interest, processing continues to page connector P3.

The sensor address keeps track of the location of the pixel in the video frame and points to a memory address where the corresponding YOLD value of the pixel from the previous video frame. The sensor address is advanced in block ADVANCE SENSOR ADDRESS 1010. After block ADVANCE SENSOR ADDRESS 1010, the intensity of the pixel in the previous video field YOLD is read and compared to the new pixel YNEW in block READ YOLD COMP YNEW 1012. YOLD is stored in a sensor element address as shown in FIG. 8.

If YOLD equals YNEW, then edge is cleared in block CLEAR EDGE 1040. If YOLD is greater than YNEW, processing continues with block SUBTRACT YNEW FROM YOLD 1022 yielding a positive result which is compared to one forth YNEW in block COMPARE TO ¼ YNEW 1024. If YOLD is less than YNEW, processing continues with block SUBTRACT YOLD FROM YNEW 1032 yielding a positive result which is compared to one forth YOLD in block COMPARE TO ¼ YOLD 1034.

Both block COMPARE TO ¼ YNEW 1024 and block COMPARE TO ¼ YOLD merge onto decision EDGE 1026. If the compare outcome is less, edge is cleared in block CLEAR EDGE 1040. If the compare outcome is more, edge is set in block SET EDGE 1028 and edge counter is incremented in block EDGE COUNT INC 1030.

The purpose of decision 1014, block 1022, block 1024, block 1032, block 1034, and decision EDGE 1026 is to create an edge signal that signifies a change in the intensity of the pixel. The edge signal in this invention is an edge derived from the same pixel found in two consecutive video frames and not a traditional edge derived from neighboring pixels in the same video frame.

The edge method described in FIG. 10 is simple and has the advantage of dealing totally in positive numbers. Another means is to use an absolute function on the difference. Comparing the result to one-fourth the smaller of the pixel intensities helps deal with noise in the higher intensities ranges while still allowing edges in low intensity ranges.

Those skilled in the art know that edges are often calculated by applying a kernel to a 2D image. In this invention, the change in intensity occurs over a number of fields so a 3D kernel is more appropriate.

Figure 11:
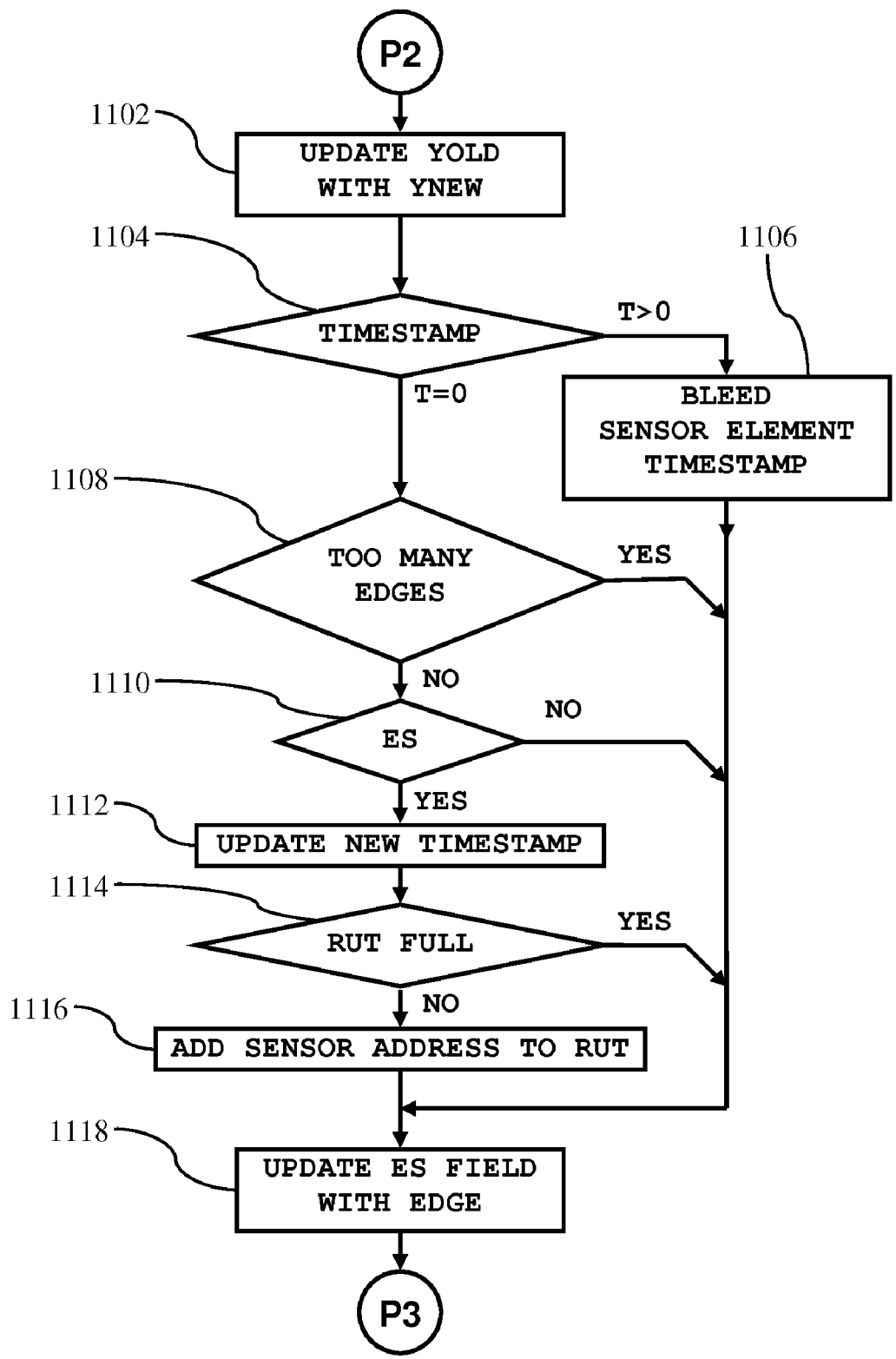

FIG. 11 is a flowchart continuation of the sensor element process beginning with the page connector P2 from FIG. 10. After edge is calculated, the new pixel value can be saved in memory in block UPDATE YOLD WITH YNEW 1102. Processing continues with the decision TIMESTAMP 1104. If the timestamp hasn't already been read it should be done next. If the timestamp is greater than zero the timestamp is decremented in block BLEED SENSOR ELEMENT TIMESTAMP 1106.

If the timestamp is zero, and only if the timestamp is zero, there is an opportunity to update the timestamp. Updating a sensor element timestamp in this video example depends ultimately on edge. However, in the experimentation of the invention it was convenient to train using DVD movies. In a DVD movie there are often scene changes and view pans where an inordinate number of edges occur. These edges from scene change or view pan have little to do with potential learnable objects. Therefore instead of training from edge directly, edge is stored in the sensor element ES field as shown in FIG. 8. A determination of the usefulness of a video frame is made by counting the number of edges and ignoring the video frame if the count is too high. If there are too many edges, a flag TOO MANY EDGES is set. The means to set flag TOO MANY EDGES is described later in FIG. 12.

If the edge count from the previous video frame is too high then after decision TOO MANY EDGES 1108, processing continues to block UPDATE ES FIELD WITH EDGE 1118 without updating the timestamp. If the edge count is NOT too high at decision ES 1110, the sensor element timestamp is updated in block UPDATE NEW TIMESTAMP 1112.

There are several methods for generating new links to fill empty links. For example, the new link can be generated from a random number generator, adjusted to the memory organization being used, and trained to determine if the new link contributes to the updating of the timestamp over the course of many video frames. Another method, and the one used in figures FIG. 10 to FIG. 16, is to store the addresses of sensor elements or internal elements with recently updated timestamps in a memory list and use these entries as new links. This memory list is called a Recently Updated Timestamp list or RUT list. Using a RUT list has the advantage that one knows that the generating element has updated its timestamp at least once before it is used to form a new link which is a modest improvement over a new link derived from a completely random number.

From block UPDATE NEW TIMESTAMP 1112, processing continues with decision RUT FULL 1114. If the RUT list is full, there is no room for the sensor address and processing continues with block UPDATE ES FIELD WITH EDGE 1118. If the RUT list is NOT full, the sensor address is stored as a possible new link in the RUT list in block ADD SENSOR ADDRESS TO RUT 1116, and then processing continues with block UPDATE ES FIELD WITH EDGE 1118.

After ES determines the processing flow, it can be updated with edge in block UPDATE ES FIELD WITH EDGE 1118 to get ready for the next field. The sensor element processing continues with page connector P3.

Figure 12:
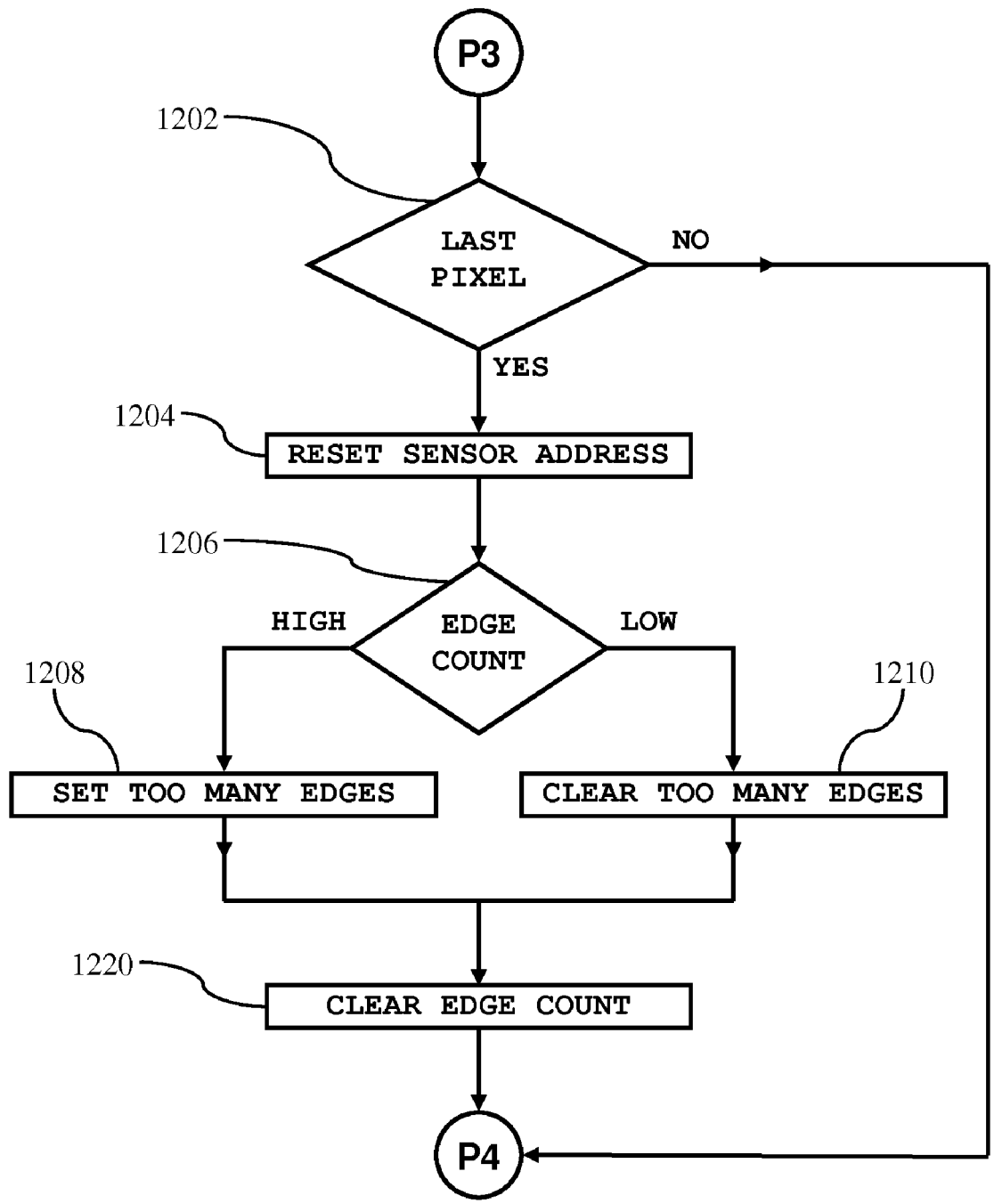

FIG. 12 is a flowchart continuation of the sensor processing starting with the page connector P3. If the pixel being processed is NOT the last in the video frame then at decision LAST PIXEL 1202, processing continues to page connector P4. If the pixel being processed is the last in the video frame then at decision LAST PIXEL 1202, processing continues to block RESET SENSOR ADDRESS 1204.

At block RESET SENSOR ADDRESS 1204 the sensor address pointing to the sensor elements is reset. Processing continues to decision EDGE COUNT 1206 wherein the pixel edge count is compared to a predetermined threshold. If the edge count is too high, then the TOO MANY EDGES flag is set in block SET TOO MANY EDGES 1208, otherwise the TOO MANY EDGES flag is cleared in block CLEAR TOO MANY EDGES 1210. In both cases processing continues with block CLEAR EDGE COUNT 1220 in order to ready the edge counter to count the edges of the next video frame. Processing then continues to page connector P4.

Figure 13:
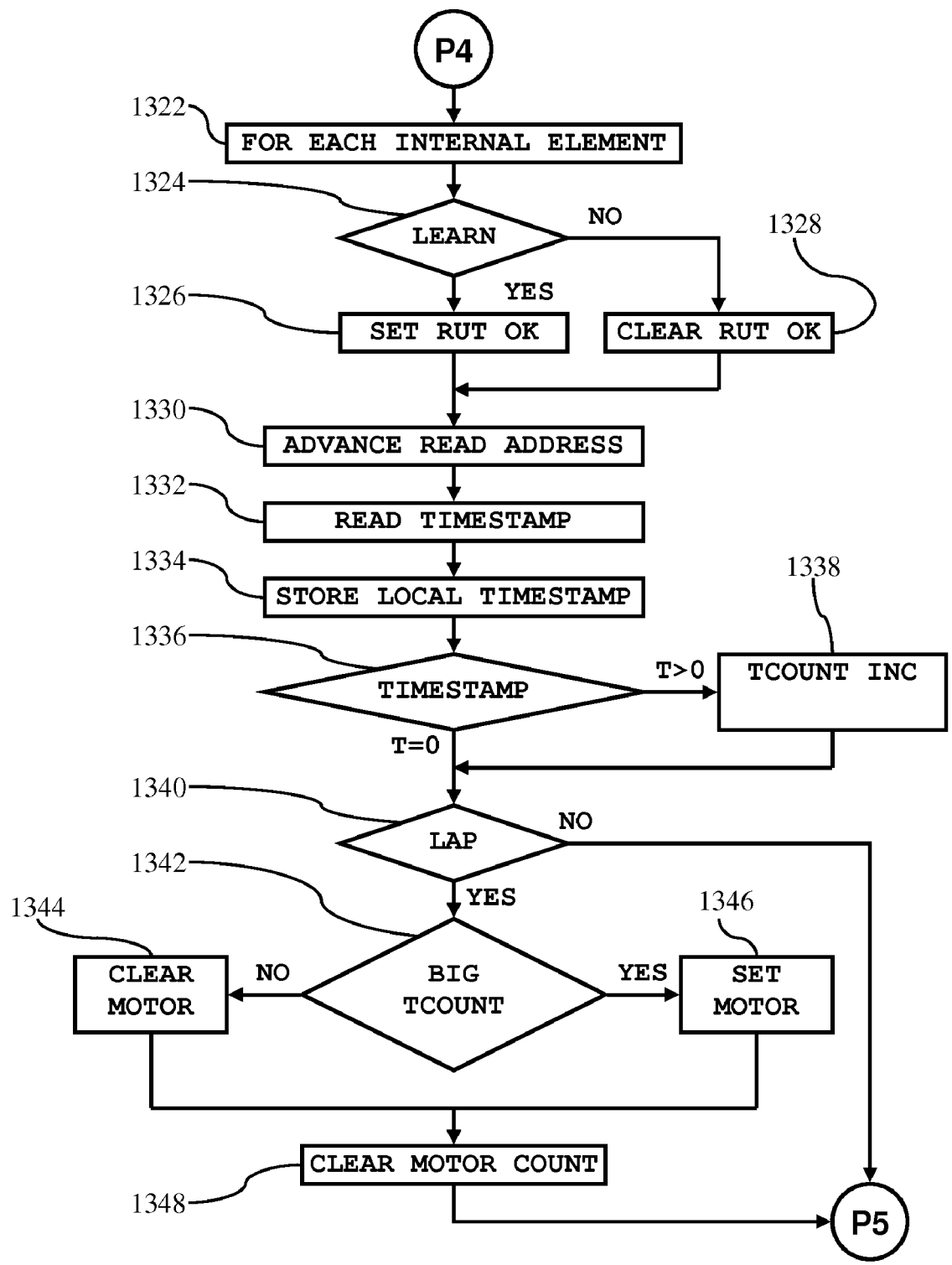

FIG. 13 is a flowchart of the internal element process starting with page connector P4. Appropriate initialization is performed in block FOR EACH INTERNAL ELEMENT 1322 which includes, on the first pass, setting up a read address and a write address, both pointing to memory at the beginning of the internal elements.

Processing continues with decision LEARN 1324. If no learning is required in decision LEARN 1324 then a RUT OK flag is cleared in block CLEAR RUT OK 1328 or if there is learning required in decision LEARN 1324 then RUT OK is set in block SET RUT OK 1326. The RUT OK flag is used subsequently to determine if an empty link position can be filled with a link from the RUT list. If the RUT OK flag survives, the RUT list link can be used.

There are two addresses associated with internal elements, the read address and the write address. The read address is advanced in block ADVANCE READ ADDRESS 1330. The timestamp at the read address is read in block READ TIMESTAMP 1332 and a copy of this timestamp is made in block STORE LOCAL TIMESTAMP 1334. If the timestamp is greater than zero in decision TIMESTAMP 1336 then TCOUNT is incremented in block TCOUNT INC 1338.

TCOUNT indicates the number of internal elements with recent timestamps. TCOUNT can be used directly as a confidence value or can be compared to a user adjustable threshold value for motor output. A signal called LAP goes on each time the entire number of internal elements is processed. If LAP is off, processing continues with page connector P5. If LAP is on, decision LAP 1340 continues with decision BIG TCOUNT 1342 which determines if TCOUNT count has exceeded a user adjustable threshold. A motor output signal is either cleared or set in block CLEAR MOTOR 1344 or block SET MOTOR 1346 depending on the result of decision BIG TCOUNT 1342. Processing continues with block CLEAR MOTOR COUNT 1348 which clears MOTOR COUNT for the next pass through all the internal elements. Processing continues to page connector P5.

Figure 14:
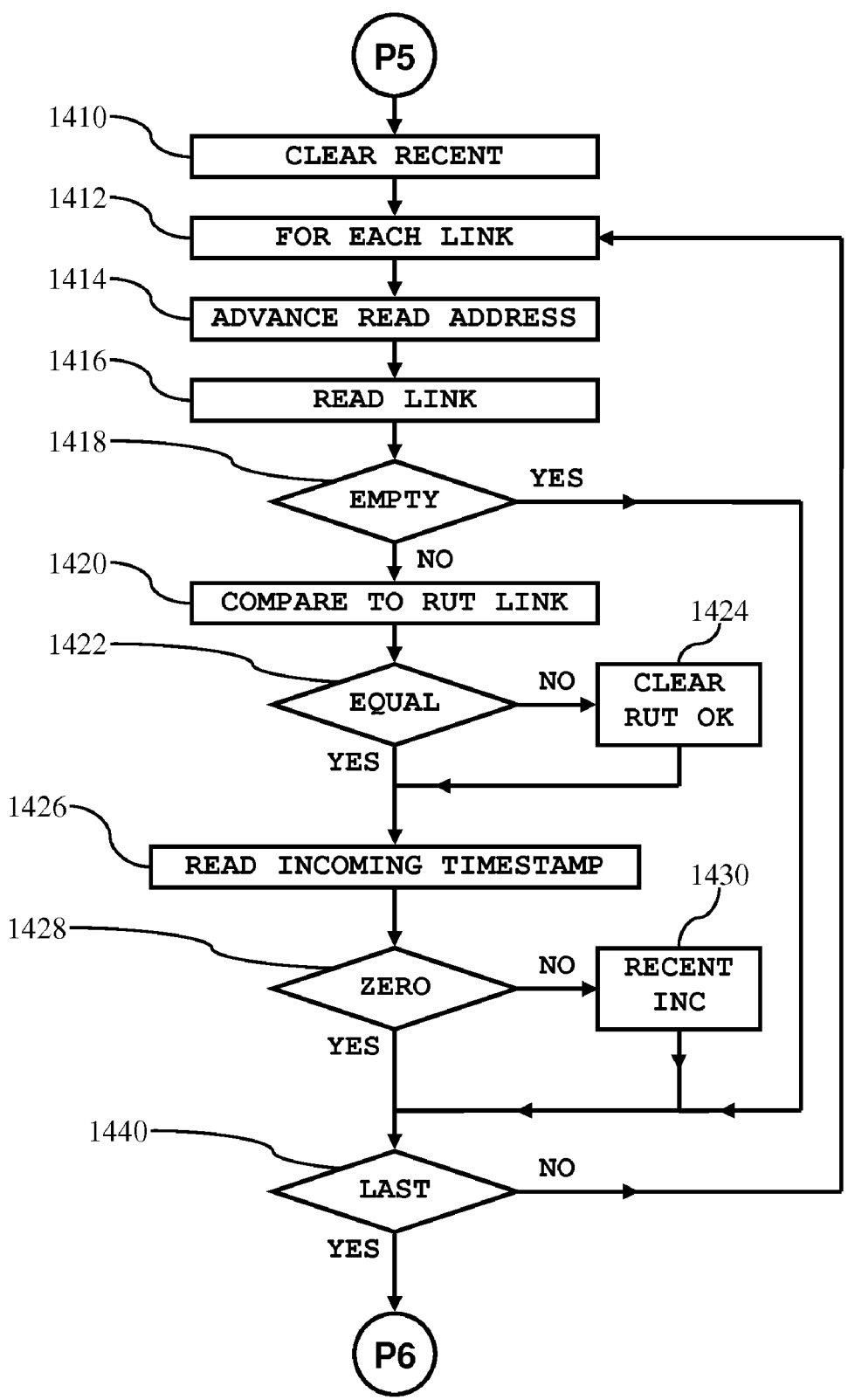

FIG. 14 is a flowchart continuation of the internal element process starting with page connector P5 from FIG. 13. RECENT is a count of the internal element links that have recent incoming timestamps. RECENT is cleared in block CLEAR RECENT 1410 in preparation for counting the incoming timestamps that are recent. Other initializations for the links are made in block FOR EACH LINK 1412. The read address is advanced in block ADVANCE READ ADDRESS 1414. This is the same read address that was advanced previously in block ADVANCE READ ADDRESS 1330 because the link data directly follows the timestamp data in a memory organization as shown in FIG. 8. The link is read in block READ LINK 1416.

If the memory is initially cleared, as in most cases, the links are also initially empty, and will remain so until they are filled up with links from the RUT list. If the link is empty then decision EMPTY 1418 continues with decision LAST 1440 to determine if this is the last link of the element. If the link is NOT empty, processing continues with block COMPARE TO RUT LINK 1420 and decision EQUAL 1422. If the two links are not equal the RUT link will not be used and the RUT OK FLAG is cleared in block CLEAR RUT OK 1424. Processing continues with READ INCOMING TIMESTAMP 1426.

At block READ INCOMING TIMESTAMP 1426, the timestamp of the internal element or sensor element is read form backward pointing link and processing continues with decision ZERO 1428. If the incoming timestamp is zero at decision ZERO 1428, processing continues with decision LAST 1440. If the incoming timestamp is NOT zero at decision ZERO 1428, then RECENT is incremented in block RECENT INC 1430 and processing continues with decision LAST 1440.

At decision LAST 1440, if the current link is NOT the last link then processing returns to block FOR EACH LINK 1412 in order to process the rest of the links. Otherwise processing continues with page connector P6. At this point in the processing, the local timestamp, the links, and all the incoming timestamps have been read.

Figure 15:
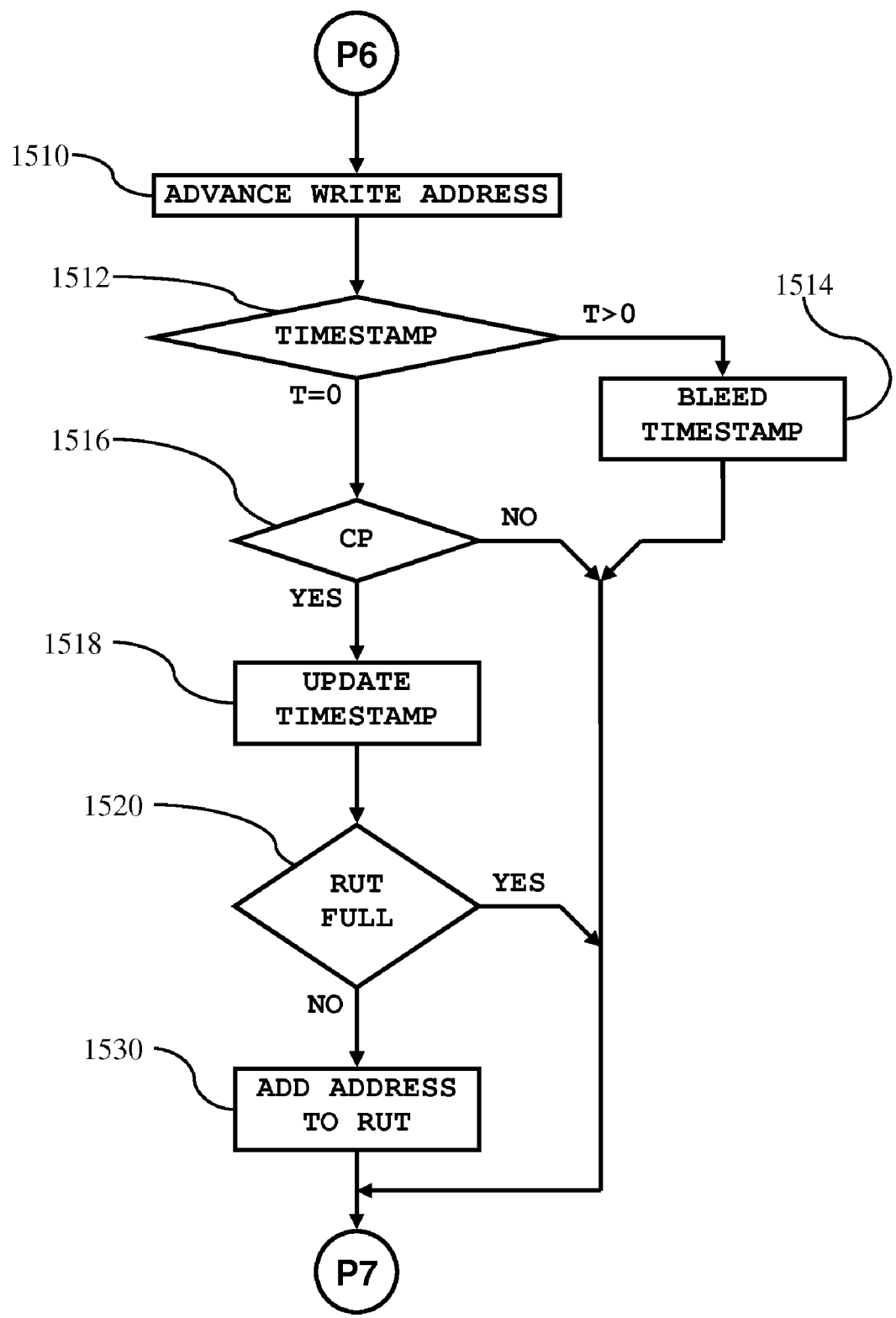

In FIG. 15, starting with the page connector P6, processing continues to block ADVANCE WRITE ADDRESS 1510 wherein the write address is advanced. Processing continues with decision TIMESTAMP 1512. If the local timestamp is greater than zero, then the local timestamp is decremented in block BLEED TIMESTAMP 1514 and processing continues with page connector P7. Otherwise, if the local timestamp is zero, there is a possibility that the timestamp should be updated responsive to incoming timestamps and processing continues with decision CP 1516.

Decision CP 1516 determines if the incoming timestamps are chronoproximate and if the local timestamp is updated. In the memory organization of FIG. 8 there are three backward pointing link fields, and consequently, a possibility of up to three incoming timestamps, one for each internal element, so it is reasonable to require at least two incoming timestamps to be non zero. If this is the requirement then RECENT must be greater than or equal to 2. Other chronoproximate criteria are possible.

If the incoming timestamps are NOT chronoproximate then processing continues to page connector P7. If the incoming timestamps are chronoproximate then the processing at decision CP 1516 continues to block UPDATE TIMESTAMP 1518 where a new local timestamp is updated and will subsequently start down counting. Processing then continues with decision RUT FULL 1520. At decision RUT FULL 1520, if the RUT list is full then processing continues with page connector P7. If the RUT is not full, then the address of the local timestamp is stored in the RUT list in block ADD ADDRESS TO RUT 1530. Processing continues with page connector P7.

Figure 16:
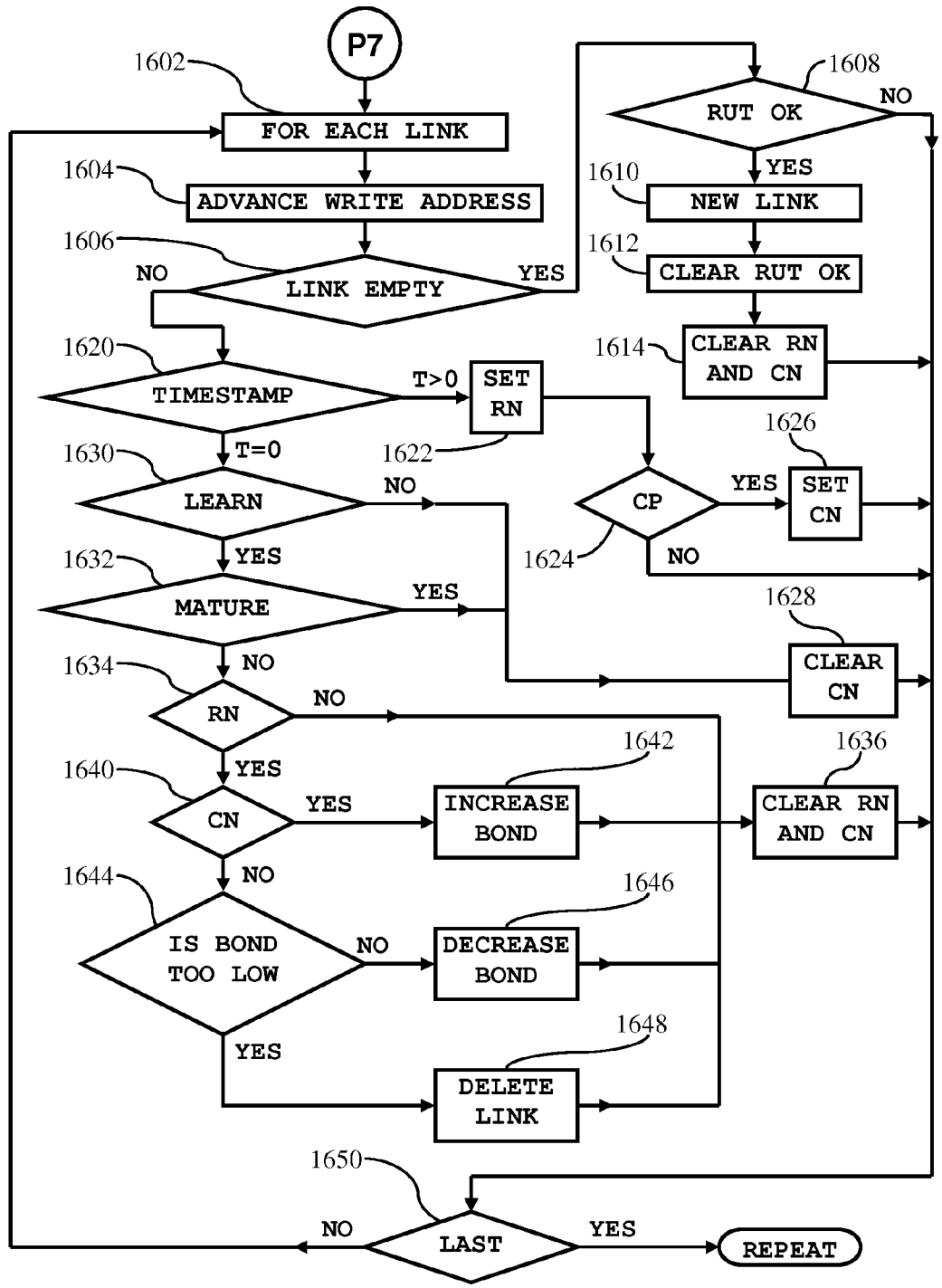

FIG. 16 is a flowchart continuation of the internal element processing and more specifically the link and bond updating starting at page connector P7 from FIG. 15. Initialization of the link write cycle begins with block FOR EACH LINK 1602. Next, the write address is advanced in block ADVANCE WRITE ADDRESS 1604. This is the same write address as in block ADVANCE WRITE ADDRESS 1510 since the link fields directly follow the timestamp fields in a memory organization as shown in FIG. 8.

It is assumed that the link has already been read from block READ LINK 1416 and a determination if the link is empty is made again at decision LINK EMPTY 1606. If the link is empty the processing continues with decision RUT OK 1608 wherein a determination is made if the empty link should be filled. The RUT OK signal is possibly set in block SET RUT OK 1326 and if the RUT OK signal previously survived repeated interrogations at decision EQUAL 1422 and block CLEAR RUT OK 1424 then the potential new link from the RUT list is not equal to any of the existing links and can be safely used as a new link without the possibility of a connection as illustrated in FIG. 9B. If the RUT OK signal is set, then the link from the RUT list is put into the empty link and an initializing bond number in written in block NEW LINK 1610. The RUT OK signal is cleared in block CLEAR RUT OK 1612 to stop any subsequent empty links to be filled by the same RUT list entry just used. The RN and CN fields are cleared in block CLEAR RN AND CN 1614 and processing continues with decision LAST 1650.

If the link is NOT empty at decision LINK EMPTY 1606 then processing continues with decision TIMESTAMP 1620. It is assumed that the incoming timestamp for all the internal element timestamp inputs have already been read from block READ INCOMING TIMESTAMP 1426. If the incoming timestamp is greater than zero at decision TIMESTAMP 1620 then the RN field is set in block SET RN 1622 to indicate that the incoming timestamp is recent.

Processing continues with decision CP 1624. Decision CP 1624 and decision CP 1516 are the same criteria. If the incoming timestamps are chronoproximate then the CN field is set in block SET CN 1626 and processing continues with decision LAST 1650. If the incoming timestamps are NOT chronoproximate then the CN field is not changed and processing continues with decision LAST 1650.

If at decision TIMESTAMP 1620 the incoming timestamp is zero then processing continues with decision LEARN 1630. If the learn mode is turned off at decision LEARN 1630, the CN field is turned off in block 1628, and processing continues with decision LAST 1650. If the learn mode is turned on at decision LEARN 1630 then processing continues with decision MATURE 1632.

In decision MATURE 1632 the bond field is interrogated to determine if the link is mature. The bond field is a measure of the effectiveness of the link and used only in learn mode. The BOND field is read at the same time as the link field in block READ LINK 1416 if the memory organization of FIG. 8 is adopted.

At decision MATURE 1632 the bond field is compared to some predetermined threshold. If the predetermined threshold is exceeded then the bond is determined to be mature and processing continues with block CLEAR CN 1628 and then to decision LAST 1650. Once a bond is mature no change to the link or the bond is allowed.

If the bond field is NOT mature at decision MATURE 1632, there is a possibility that the bond or the link will change and processing continues with decision RN 1634.

If the RN field is zero at decision RN 1634, the RN and CN fields are cleared in block CLEAR RN AND CN 1636, and processing continues to decision LAST 1650. If the RN field is set, processing continues with decision CN 1640. The RN field is derived and stored from the incoming timestamp. If the flow reaches decision CN 1640, the stored RN is set while the incoming timestamp from decision TIMESTAMP 1620 is zero, indicating that the incoming timestamp has just gone to zero in the previous video field. This assures that decision CN 1640 is only accessed once per any incoming timestamp cycle.

At decision CN 1640 a determination of what will be done with the bond is made. If the CN field is set indicating that the link is chronoproximate then the bond is increased in block INCREASE BOND 1642, the RN and CN fields are cleared in block CLEAR RN AND CN 1636, and processing continues with decision LAST 1650.

If the CN field is cleared then the link did not previously contribute to the timestamp becoming chronoproximate and the bond will be decreased or deleted entirely. If the CN field is cleared at decision CN 1640, processing continues with decision IS BOND TOO LOW 1644.

In decision IS BOND TOO LOW 1644, the bond is compared to a minimum threshold and if the bond is too small, the entire link is deleted in block DELETE LINK 1648, RN and CN are cleared in block CLEAR RN AND CN 1636, and processing continues with decision LAST 1660. If the bond is NOT too low, the bond is decreased in block DECREASE BOND 1646, RN and CN are cleared in block CLEAR RN AND CN 1636, and processing continues with decision LAST 1650.

If the link just processed is NOT the last link, then at decision LAST 1650 processing continues with block FOR EACH LINK 1602 wherein the next link will be processed. If the link just processed is the last link, then at decision LAST 1650 processing will continue with REPEAT.

The meaning of REPEAT will depend on the application hardware and/or software as one skilled in the art can readily determine. Many video processing platforms incorporate a frame grabber connected to a computer. In these systems, the processing flow is more batch-like wherein an entire video frame is captured, the edges and sensor elements are processed next, and the internal elements and motor elements are processed last. The meaning of REPEAT in this case would be to go fetch the next video frame and start again.

Although the flowcharts depicted in figures FIG. 10 through FIG. 16 amply illustrate the processing necessary for a frame grabber system, the flowcharts are actually conceived with a pipelined architecture in mind. Pixels are not saved in a buffer. The sensor element processing starts almost immediately with a new ready pixel signal and is followed by the processing of one and only one internal element in order to return quickly to the sensor element processing without losing any pixels. In this pipelined architecture case, the meaning of REPEAT in FIG. 14 means to go back to the START of FIG. 10 in order to interrogate the pixel availability.

Hardware.

Initial experiments of the timestamp neural network are done with a Xilinx ML402 development platform. Although this development platform is an FPGA (Filed Programmable Gate Array) this should not be construed as a limitation of the invention. In fact, the FPGA serves as the processing unit of the system and communicates to a memory with read and write commands in the same fashion as any computer system. This invention can be programmed on any laptop, desktop, mainframe computer, or the hardware described below.

Digital CCIR656 video input signals are brought into a development board with an NTSC daughter card. The daughter card attaches to the expansion port of the development board.

On the development board, a Xilinx Virtex4 SX35 FPGA is programmed in VHDL to function as the timestamp neural network. The VHDL source code is included at the end of the specification section. Timestamp, bond, link, and other data fields are stored on an onboard 256 K word by 36 bit Cypress CY7C1354B SRAM with a memory organization shown in FIG. 8. Of the 256 K words, 128 K words are dedicated to the storage of the sensor elements, and 128 K words are dedicated to the storage of 32 K internal elements, each with three possible links.

Recently updated timestamp links or RUT links are stored in a BRAM memory on the XILINX FPGA. A Xilinx Virtex4 BRAM stores 512 18 bit recently updated timestamp links.

An asynchronous FIFO16 interfaces 27 MHz video clock domain CCIR656 signals to 100 MHz SRAM clock domain. At a clock speed of 100 MHz, and a main loop of 18 clock cycles, the development board processes all sensor elements, internal elements, and motor elements in 6 ms, faster than NTSC video rates.

Figure 17:
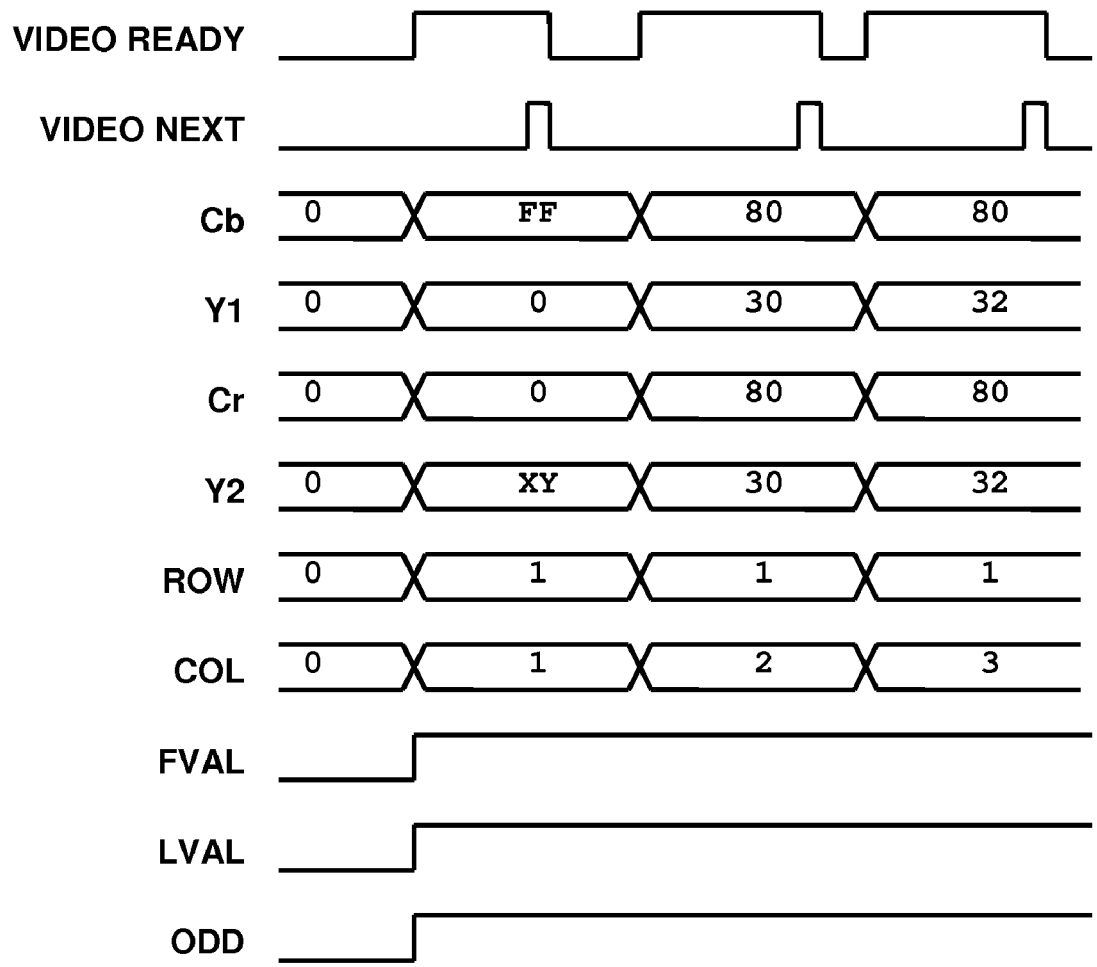

FIG. 17 illustrates the required preprocessing of the CCIR656 signals before they enter the VHDL timestamp neural network entity. The Cb, Y1, Cr, and Y2 signals are bundled into input packages and update at a rate of 27 divided by 4 MHz. The ROW and COL (column) also indicate the pixel position in the video frame. Additionally, the LVAL, FVAL, and ODD signals are also decoded. The VHDL code at the end of the specification section makes use of only the Y1, ROW, COL, FVAL, and ODD signals.

All these signals update on the rising edge of the VIDEO READY signal. If the finite state machine is ready to process a sensor element, then VIDEO NEXT is raised, and both VIDEO READY and VIDEO NEXT drop on the next clock cycle. The VIDEO NEXT signal connects to the read enable of an asynchronous FIFO register on the XILINX fabric signaling that the next video package is to be delivered. A VIDEO READY signals the asynchronous FIFO when the SRAM memory is cleared and the flow of CCIR data should begin.

Caution is required to read the VHDL code. All the processes occur simultaneously. For example, all the processing for an internal element link write in FIG. 16, VHDL lines 163 to 184, is done in one clock cycle.

In VHDL the assignment operator <= does not mean that the register is updated immediately but rather is scheduled to be updated after all processes are reconciled. For example, k<=0; if (k>20) then m<=m+1; makes no sense in a language like C++, even with correct syntax, because the if condition in C++ always fails. But in VHDL, the k is not updated until the end of the process and the if condition can be true or false.

FIG. 18 illustrates the main loop of the finite state machine and the resulting action taken on the SRAM memory. Even though all the processes occur simultaneously, there is a stepwise requirement to access the SRAM memory. STATE loops 14 through 31 as shown in the first column. These states result in the read/write functions shown in the second column, the address register used to address the memory in the third column, and the resulting data in the forth and fifth columns.

Unused data is labeled NA. States 22, 24, and 31 are unused states to allow three clock cycles from the read command to the arrival of memory data at the mem_di(0) register.

FIG. 18 shows two sensor element read and write cycles for every one internal element cycle. Two sensor elements are required because the pixel packages arrive at 27/4 MHz, 6.75 MHz, or 148 ns. The main processing loop operating at 100 MHz or 10 ns with 18 states is 180 ns in duration.

In VHDL line 11 to 13, the video signals as shown in FIG. 18 are inputted into the timestamp neural network entity. Only the signals Y1, FVAL, ODD, COL, and ROW are used. The others are for future expansion.

In VHDL lines 14 to 17, and 22, adjustable variables from a user interface (not shown) are inputted into the timestamp neural network entity. Learn_mode=1, bond_new=32, bond_max=240, bond_inc=2, bond_dec=3, sensor_term=5, internal_term=10, and threshold=10 are reasonable operating variables. Sensor_term is the initialization value of a sensor element for a decaying timestamp. Internal_term is the initialization value of an internal element for a decaying timestamp.

VHDL lines 18 to 21 are the memory interface. The SRAM on the XILINX development board uses a NoBL bus. A two clock cycle delay of the mem_do signals is provided in the top module of the VHDL code (not shown) and the timestamp neural network entity is written with the requirement that data arrives in the mem_di(0) register three clock cycles after the read command. One skilled in the art can use other memories.

In VHDL line 23 and 24, the timestamp neural network supplies output with the signals MOTOR and TCOUNT. MOTOR is a binary threshold result. TCOUNT is a confidence factor.

In VHDL lines 28 to 34, the memory organization is coded according to FIG. 8.

In VHDL lines 53, 54, and 92 through 119, VHDL signals recent_iels, recent_tells, and recent_mels are counts of incoming timestamps from internal elements, total sensor and internal elements, and mature internal elements and sensor elements, respectively. The recent_tels VHDL signal corresponds to the TCOUNT counter in FIG. 13.

VHDL lines 121 to 128 and lines 169 to 184 correspond to the internal element link and bond updating shown in FIG. 16. In VHDL lines 121 to 123, the VHDL signal cp or chronoproximate is calculated. If recent_tels is greater than 2, then cp is set. In VHDL lines 125 to 128 the VHDL signal cn is calculated for each link. If two or three links are chronoproximate, then the recent links are marked with a cn signal which is stored with the link and bond. The cn signal does not turn off until the local timestamp down counts to zero and the rn signal is still on, which is a handshake method to assure that cn signal is counted once and only once, and does not matter if the link became recent before of after the other links.

VHDL lines 190 to 205 calculate the edge and edge_count signals. The y_new signal comes from the delayed y1 input. The y_old signal comes from the memory. In line 193, roi stands for region of interest and signifies that a new pixel is ready and is within predefined row and column restraints. VHDL lines 192 and 194 to 198 correspond to the edge calculation in FIG. 10. The divide by four in block COMPARE TO ¼ YNEW 1024 and block COMPARE TO ¼ YOLD is accomplished with concatenating operators in the VHDL lines 197 and 195 respectively.

In VHDL lines 207 to 227 and lines 243 to 253 the RUT list is coded. The RUT list is stored in rut_ram, an inferred Xilinx two port BRAM in lines 207 to 212. The input to the RUT can come from either the address of a recently updated sensor element in VHDL line 222, or from the address of a recently updated internal element in VHDL line 225. Rut_count is a counter that addresses the write port of the rut_ram. When writes are generated, rut_count counts until the upper bit, rut_full is set. Rut_full stops new writes and allows new links to be read. Rut_count continues with each read and when enough reads are generated the rut_full signal goes off with the rollover. When rut_full goes off, the cycle is complete and writing another group of addresses begins again.

The read address for the rut_ram is generated by a pseudo random number generator rut_random. This scrambles the links so that any preference to links in the horizontal axis, or any other anomaly created by the pixel raster scan, is avoided.

Any VHDL lines not discussed above are easily understood by one skilled in the art.

CONCLUSIONS

Now that a timestamp neural network is described, there are some obvious and some not so obvious improvements that can be made. And there are many things to point out and consider.

The timestamp neural network described above has a constant three links per each internal element but the number of links per internal element does not have to be three nor does it need to be constant. There are biological examples of a single neuron having a thousand or more dendrite inputs. On the opposite extreme, there is the logic gate example wherein any logic complexity can be built by a plurality of two input NAND gates.

Internal elements can have a variable number of links if there is a means to indicate decision LAST 1440 in FIG. 14 and decision LAST 1650 in FIG. 16 are complete. Such an indication can be an extra end-of-element field in the link memory organization.

The VHDL code and FIG. 10 to FIG. 16 use backward pointing links. However, forward pointing links, or a hybrid forward and backward pointing links, can work as well.

There are many different memory organizations that can be implemented, as one skilled in the art can readily devise. The link, bond, and timestamp fields for the internal elements do not have to be in contiguous memory locations nor do they have to be in the same memory as long as they are somehow associated by the processing.

The criterion for determining whether incoming timestamps are chronoproximate can also vary. If the number of incoming links is one hundred, for example, then a significant portion of the incoming timestamp must be recent before those incoming timestamps are chronoproximate. If the criterion for determining whether incoming timestamps are chronoproximate does not require a simple majority of timestamp inputs, there arises the possibility that two or more completely orthogonal sets of inputs can be chronoproximate.

A not so obvious behavior was discovered with the three timestamp input system described in the VHDL code. When training this system with images from DVD movies, the first and second bonds to mature from sensor elements are relatively close together in the video field. This happens because pixels close together are more likely to be chronoproximate than pixels farther apart. The third bond to mature tends to be not as close as the first two creating a third-man-out behavior. This happens because the criterion for incoming timestamps to be chronoproximate is to have two recent timestamps. If either of the two mature timestamps is recent then there is high probability that the other mature timestamp is also recent and therefore the criterion is already met. One solution is to raise the number of required recent timestamps inputs to three when there are two mature links.

Another non obvious discovery of this invention is the means in which the bond is modified. The more obvious way is to urge the bond downward periodically, like the timestamps, and urge the bond upwards when the links are chronoproximate. Experiments with this obvious method prove difficult because it is difficult to control the rate of video images, especially with hand held objects and cameras. In the less obvious means shown in the VHDL code and in FIG. 10 through FIG. 16, the bonds are updated only when a links are revisited, that is, only when one of the links has an incoming timestamp greater than zero. If a link shows an incoming timestamp that is non zero, and while that timestamp is non zero, none of the other incoming links are chronoproximate, and then that bond decreases.

There is a problem with the non-obvious revisited means of bond updates that a link could form that is never revisited again or seldom so, wasting a link and memory. In this case, a hybrid bond adjusting means can be designed that adjust bonds both on revisits and decrements bonds or deletes links at a slow periodic rate.

Another improvement to determine if incoming timestamps are chronoproximate is to require any incoming timestamp from an internal element to be mature. This can avoid the possibility of a link forming to an internal element that may be subsequently deleted.

In figures FIG. 13, an output was created by comparing TCOUNT to a predetermined threshold. The output is updated each time all the internal elements are processed. The TCOUNT is a general indication or a confidence measure of how familiar the system is to a sequence of learned video images.

An improvement is to have two or more separate systems learn different video streams and then compare the TCOUNT responses to the same video stream. These comparisons are more tolerant to the variation of edge counts in the video frames.

Alternatively, the same effect can be had by using a single system with an additional training set field added to the memory organization of the internal elements indicating which sequence of video images is being learned and a separate TCOUNT for each training set field thus eliminating the need for two or more separate systems.

Another way to create real world outputs form the timestamp artificial neural network is to connect outputs directly to internal elements. For example, when an internal element updates its timestamp, an output signal is turned on, possibly for some predetermined time. Or, alternatively, an output signal is turned on when an internal element timestamp is updated and the same output signal is turned off when some other internal element timestamp is updated.

It is previously explained that even a small timestamp neural network as depicted in FIG. 1 can be used to recognize a line moving from right to left. It is conceivable that a more complex timestamp neural network could recognize more sophisticated objects, that is, if they are moving. A timestamp neural network as so far described will not produce an output from a single frame of video image due to the temporal stillness a single frame represents. This limitation does not apply to a traditional artificial network, optical character recognition systems, or to machine vision in general. However, a mechanical camera motion or an electronic repositioning of the image could generate the necessary edges to run the timestamp neural network even using still images.

Interesting questions arise when the timestamp neural network is made to read characters or text. If the timestamp neural network is a good model for biological neurons, then it is expected that motion of the eyes or text is required for reading. One question is if the human saccade is an efficient movement for the timestamp neural network. Another question, on the biological side, is if visual processing of text happens without saccade. Another question is does the visual processing occurs during, shortly before, or shortly after the eye stops moving.

During learning, the probability that temporal events associate properly increases if the training memory size is kept small. Creating a small memory window and gradually increasing the size, speeds learning.

The number of elements separating an internal element from its sensor elements can be defined as its level. By tracking the level, a loop connection such as that depicted in FIG. 9D can be avoided. Another interesting question is whether loop connections are necessary for more abstract thinking.

There is also some biological evidence suggesting that certain levels of internal elements should not be connected. For example, the third and fourth levels of the V4 visual cortex are not generally interconnected with neurons of other levels. This suggests that certain levels of a timestamp neural network may also not be connected, for reasons of optimum performance and those constraints may need to be empirically discovered.

The timestamp neural network described above wherein each internal element has only three inputs, demonstrates that a sophisticated trainable system can be achieved without a large number of connections as in a traditional Artificial Neural Network, thus reducing the required amount of hardware or processing.

The timestamp neural network described above uses only video frames as inputs. This is not a limitation to the invention. On the contrary, any type of signal from any type of sensor or data stream can be subjected to a threshold process to create an event that can be processed by a timestamp neural network. The inputs to the timestamp neural network can be from sources including image, pressure, position, sound, or temperature. In fact, the fact that all signals can be translated into timestamps is an indication of allowing wide variations of sensory data sources to be learned in a seamless integration.

The timestamp neural network described above works efficiently, calculates with only positive integers, does not multiply, and operates in real time. A timestamp neural network can also work on laptop, desktop, embedded, or mainframe computer.

Since any analog signal can be reduced to a sequence of temporal elements, the invention applies to a wide variety of sensor signals and applications, including voice recognition, pattern recognition, motor control, and robotics.

VHDL Code Listing

```
001 library IEEE;
002 use IEEE.STD_LOGIC_1164.ALL;
003 use IEEE.STD_LOGIC_UNSIGNED.ALL;
004 use IEEE.STD_LOGIC_ARITH.ALL;
005
006 entity timestamp_neural_net is port(
007 clk,reset : in std_logic;
008 video_reset : out std_logic;—start video stream
009 video_ready : in std_logic;—data ready
010 video_next : out std_logic;—get next data
011 cb,y1,cr,y2 : in std_logic_vector(7 downto 0);
012 lval,fval,odd : in std_logic;
013 col,row : in std_logic_vector(9 downto 0);
014 learn_mode : in std_logic;
```

015 bond_new,bond_max :in std_logic_vector(15 downto 0);
016 bond_inc,bond_dec :in std_logic_vector(15 downto 0);
017 sensor_term,internal_term :in std_logic_vector(15 downto 0);
018 mem_addr : out std_logic_vector(17 downto 0);—256 K
019 mem_data_in : in std_logic_vector(35 downto 0);—from mem
020 mem_do : out std_logic_vector(35 downto 0);—to mem
021 mem_rd,mem_wr : out std_logic;
022 threshold : in std_logic_vector(15 downto 0);
023 motor : out std_logic;—output signal
024 tcount : out std_logic_vector(15 downto 0));
025 end timestamp_neural_net;
026
027 architecture Behavioral of timestamp_neural_net is
028 subtype tstamp is natural range 15 downto 0;—Timestamp
029 subtype yold is natural range 23 downto 16;—YOLD
030 constant es : natural :=35;—Edge
031 subtype bond is natural range 15 downto 0;
032 subtype link is natural range 33 downto 16;
033 constant rn : natural :=34;—Link is Recent
034 constant cn : natural :=35;—Link Chronoproximate
035 signal state : natural range 0 to 31;
036 subtype slv is std_logic_vector;
037 type aivision_type is array(1 to 9) of slv(7 downto 0);
038 signal aivision : aivision_type;—vision input array
039 type mem_di_array_type is array(0 to 8) of slv(35 downto 0);
040 signal mem_di : mem_di_array_type;
041 type s_ad_type is array(1 to 6) of slv(17 downto 0);
042 signal s_ad : s_ad_type;
043 type rut_ram_type is array(0 to 1023) of slv(17 downto 0);
044 signal rut_ram : rut_ram_type;
045 signal rut_full,rut_ok,rut_rden : std_logic;
046 signal rut_wren,rut_wr_iel,rut_wr_sel : std_logic;
047 signal rut_di,rut_link_new,rut_iel_ad : slv(17 downto 0);
048 signal rut_rd_a,rut_rd_b,rut_random : slv(9 downto 0);
049 signal rut_count : slv(10 downto 0);
050 signal start_net,cp,lap,edge,new_cn : std_logic;
051 signal local_timestamp : slv(tstamp);
052 signal link_s,link_i,link_m : slv(1 to 4);
053 signal recent_iels : slv(1 downto 0);
054 signal recent_tels,recent_mels : slv(1 downto 0);
055 signal recent : slv(0 to 7);
056 signal bond_inc_new : slv(16 downto 0);
057 signal bond_dec_new : slv(15 downto 0);
058 signal edge_count : slv(11 downto 0);
059 signal tcount_0: slv(15 downto 0);
060 signal video_enable,v_reset : std_logic;
061 signal rd_ad,wr_ad : slv(17 downto 0);
062 signal roi : slv(1 to 6);
063 signal y_old,y_new : slv(7 downto 0);
064 signal fval_1,fval_os : std_logic;
065 signal too_many_edges,too_many_edges_1 : std_logic;
066
067 begin
068
069 v_reset_proc:process(clk) begin if(clk'event and clk='1')then
070 if(reset='1')then video_reset<='1';v_reset<='1';
071 elsif(start_net='1')then video_reset<='0'; v_reset<='0';
072 end if; end if; end process;
073
074 video_enable_proc:process(state,video_ready,v_reset)begin
075 if((state=17 or state=24)and video_ready='1' and v_reset='0')
076 then video_enable<='1';video_next<='1';
077 else video_enable<='0';video_next<='0'; end if; end process;
078
079 fval_1_proc:process(clk) begin if(clk'event and clk='1')then
080 if(video_enable='1')then
081 fval_1<=fval; end if; end if; end process;
082
083 fval_os_proc:process(state,video_enable,fval,fval_1) begin
084 if(video_enable='1' and fval='1' and fval_1='0')
085 then fval_os<='1';—fval oneshot
086 else fval_os<='0'; end if; end process;
087
088 mem_di_proc:process(clk) begin if(clk'event and clk='1')then
089 mem_di(0)<=mem_data_in; mem_di(1 to 8)<=mem_di(0 to 7);
090 end if; end process;
091
092 recent_proc:process(clk) begin if(clk'event and clk='1')then
093 recent(0)<='0'; recent(1 to 7)<=recent(0 to 6);
094 if(reset='1' or state=22)then
095 recent_iels<=(others=>'0');—recent Internal ELements
096 recent_tels<=(others=>'0');—recent Total ELements
097 recent_mels<=(others=>'0');—recent Mature ELements
098 elsif(state=23 or state=24 or state=25)then
099 if(link_m(4)='1')then recent_mels<=recent_mels+1; end if;
100 if(mem_di(0)(tstamp)>0)then recent(0)<='1';
101 recent_tels<=recent_tels+1;
102 if(link_i(4)='1')then recent_iels<=recent_iels+1; end if;
103 end if; end if; end if; end process;
104
105 link_proc:process(clk) begin if(clk'event and clk='1') then
106 link_s(1)<='0'; link_s(2 to 4)<=link_s(1 to 3);
107 if((state=19 or state=20 or state=21) and
108 (mem_di(0)(link)/=0)and(mem_di(0)(link'left)='0'))
then
109 link_s(1)<='1'; end if;
110 link_i(1)<='0'; link_i(2 to 4)<=link_i(1 to 3);
111 if((state=19 or state=20 or state=21) and
112 (mem_di(0)(link)/=0)and(mem_di(0)(link'left)='1')
113)then link_i(1)<='1'; end if;
114 link_m(1)<='0'; link_m(2 to 4)<=link_m(1 to 3);
115 if((state=19 or state=20 or state=21) and
116 (mem_di(0)(link)/=0) and
117 (((mem_di(0)(link'left)='1')and(mem_di(0)(bond)>=bond_max))
118 or(mem_di(0)(link'left)='0'))

119 )then link_m(1)<='1'; end if; end if; end process;
120
121 cp_proc:process(recent_tels)begin
122 if(recent_tels>=2)then cp<='1';
123 else cp<='0'; end if; end process;
124
125 new_cn_proc:process(mem_di(8)(cn),cp,recent(3)) begin
126 if((mem_di(8)(cn)='1') or—if cn is already set
127 (cp='1' and recent(3)='1')—or needs to be set
128 )then new_cn<='1'; else new_cn<='0'; end if; end process;
129
130 bond_proc:process(clk) begin if(clk'event and clk='1')then
131 bond_inc_new<=('0'&mem_di(7)(bond))+ ('0'&bond_inc);
132 bond_dec_new<=mem_di(7)(bond)−bond_dec; end if; end process;
133
134 mem_do_proc:process(clk) begin if(clk'event and clk='1')then
135 mem_do<=(others=>'0');mem_addr<=(others=>'0');rut_rden<='0';
136 mem_wr<='0'; mem_rd<='0';
137 case state is
138 when 2=>mem_wr<='1';mem_addr<=wr_ad; mem_do<=(others=>'0');
139 when 18|25=>if(roi(1)='1')then
140 mem_rd<='1'; mem_addr<=s_ad(1); end if;
141 when 23|30=>
142 if(roi(6)='1')then mem_wr<='1'; mem_addr<=s_ad(6);
143 mem_do(yold)<=aivision(6); mem_do(es)<=edge;
144 if((mem_di(1)(es)='1' and learn_mode='0') or
145 (mem_di(1)(es)='1' and learn_mode='1'
146 and too_many_edges_1='0'))then
147 mem_do(tstamp)<=sensor_term;—update timestamp
148 elsif(mem_di(1)(tstamp)>0)then
149 mem_do(tstamp)<=mem_di(1)(tstamp)−1;—bleed timestamp
150 else mem_do(tstamp)<=(others=>'0'); end if; end if;
151 when 14=>mem_rd<='1'; mem_addr<=rd_ad;
152 if(rut_full='0')then rut_ok<='0';
153 elsif(rut_link_new/=0)then rut_ok<='1';
154 else rut_ok<='0'; end if;
155 when 15|16|17=>mem_rd<='1'; mem_addr<=rd_ad;
156 when 19|20|21=>mem_rd<='1'; mem_addr<=mem_di(0)(link);
157 if(mem_di(0)(link)=rut_link_new)then rut_ok<='0'; end if;
158 when 26=>mem_wr<='1'; mem_addr<=wr_ad;
159 if(local_timestamp=0)then
160 if(cp='1')then mem_do(tstamp)<=internal_term;
161 else mem_do(tstamp)<=(others=>'0'); end if;
162 else mem_do(tstamp)<=local_timestamp−1; end if;
163 when 27|28|29=>mem_wr<='1'; mem_addr<=wr_ad;
164 mem_do(bond)<=mem_di(8)(bond);mem_do(link)<= mem_di(8)(link);
165 if(rut_ok='1' and mem_di(8)(bond)=0 and learn_mode='1')then
166 rut_ok<='0'; mem_do(bond)<=bond_new; rut_rden<='1';
167 mem_do(link)<=rut_link_new;mem_do(rn)<='0'; mem_do(cn)<='0';
168 elsif(mem_di(8)(link)=0)then mem_do<=(others=>'0');
169 elsif(learn_mode='0' or mem_di(8)(bond)>=bond_max)then
170 mem_do(rn)<=recent(3); mem_do(cn)<='0';
171 elsif(recent(3)='1')then—same as incoming timestamp>0
172 mem_do(rn)<='1'; mem_do(cn)<=new_cn;
173 elsif(mem_di(8)(rn)='1')then
174 mem_do(rn)<='0';mem_do(cn)<='0';
175 if(mem_di(8)(cn)='0')then
176 if(mem_di(8)(bond)<=bond_dec)then
177 mem_do(35 downto 0)<=(others=>'0');—delete link
178 else mem_do(bond)<=bond_dec_new;
179 end if;
180 else—cn is on, so increase bond
181 if(bond_inc_new>=('0' & bond_max))then
182 mem_do(bond)<=(others=>'1');
183 else mem_do(bond)<=bond_inc_new(15 downto 0);
184 end if; end if;
185 else mem_do(rn)<='0';mem_do(cn)<='0'; end if;
186 when others=>mem_wr<='0'; mem_rd<='0';
187 mem_addr<=(others=>'0'); mem_do<=(others=>'0');
188 end case; end if; end process;
189
190 y_new<=aivision(5); y_old<=mem_di(0)(yold);
191 edge_proc:process(clk) begin if(clk'event and clk='1')then
192 edge<='0';
193 if(roi(5)='1')then
194 if(((y_new>y_old) and
195 ((y_new−y_old)>("00"&y_old(7 downto 2))))
196 or ((y_new<y_old) and
197 ((y_old−y_new)>("00"&y_new(7 downto 2)))))then
198 edge<='1';
199 end if; end if; end if; end process;
200
201 edge_cnt_proc:process(clk)begin if(clk'event and clk='1')then
202 if(reset='1')then edge_count<=(others=>'0');
203 elsif(fval_os='1')then edge_count<=(others=>'0');
204 elsif(roi(6)='1' and edge='1' and edge_count(11)='0')then
205 edge_count<=edge_count+1; end if; end if; end process;
206
207 rut_ram_a:process(clk) begin if(clk'event and clk='1')then
208 if(rut_wren='1')then
209 rut_ram(conv_integer(rut_count(9 downto 0)))<=rut_di;end if;
210 rut_rd_a<=rut_count(9 downto 0);end if;end process;
211 rut_ram_b:process(clk) begin if(clk'event and clk='1')then
212 rut_rd_b<=rut_random; end if; end process;
213
214 rut_ad_proc:process(clk) begin if(clk'event and clk='1')then
215 if(state=14)then
216 rut_iel_ad<=rd_ad; end if; end if; end process;
217
218 rut_di_proc:process(clk) begin if(clk'event and clk='1')then
219 rut_wren<='0'; rut_wr_iel<='0'; rut_wr_sel<='0';
220 if(rut_full='0' and roi(5)='1' and mem_di(0)(es)='1' and 221 too_many_edges_1='0')then
222 rut_wren<='1'; rut_di<=s_ad(5);rut_wr_sel<='1';
223 elsif(rut_full='0' and state=26 and cp='1' and
224 local_timestamp=0 and recent_mels=3)then
225 rut_wren<='1'; rut_di<=rut_iel_ad; rut_wr_iel<='1';
226 else rut_di<=(others=>'0');
227 end if; end if; end process;
228
229 tstamp_proc:process(clk) begin if(clk'event and clk='1')then
230 if(state=18)then local_timestamp<=mem_di(0)(tstamp);
231 end if; end if; end process;
232
233 tcount_0_proc:process(clk)begin if(clk'event and clk='1')then
234 if(reset='1')then tcount_0<=(others=>'0'); motor<='0';
235 elsif(lap='1')then tcount_0<=(others=>'0');
236 if(tcount_0>=threshold)then motor<='1';
237 else motor<='0'; end if;
238 elsif(state=27 and recent_iels>=1)then
239 tcount_0<=tcount_0+1;
240 end if; end if; end process;
241 tcount<=tcount_0;
242
243 rut_cnt_proc:process(clk) begin if(clk'event and clk='1')then
244 if(reset='1' or learn_mode='0')then
245 rut_count<=(others=>'0');rut_random<=(0=>'1', others=>'0');
246 elsif(rut_count(10)='0')then
247 if(rut_wren='1')then rut_count<=rut_count+1; end if;
248 else if(rut_rden='1')then rut_count<=rut_count+1;
249 rut_random(0)<=rut_random(6) xor rut_random(9);
250 rut_random(9 downto 1)<=rut_random(8 downto 0);end if;
251 end if; end if; end process;
252 rut_full<=rut_count(10);
253 rut_link_new<=rut_ram(conv_integer(rut_rd_b));
254
255 tme_proc:process(clk) begin if(clk'event and clk='1') then
256 if(fval_os='1')then too_many_edges_1<=too_many_edges;
257 if(edge_count>=900) then too_many_edges<='1';
258 else too_many_edges<='0';
259 end if; end if; end if; end process;
260
261 roi_proc:process(clk) begin if(clk'event and clk='1') then
262 s_ad(2 to 6)<=s_ad(1 to 5);roi(2 to 6)<=roi(1 to 5);
263 roi(1)<='0';aivision(2 to 9)<=aivision(1 to 8);
264 if(reset='1')then s_ad(1)<=(others=>'0');
265 elsif(video_enable='1')then
266 if(fval='0')then s_ad(1)<=(16=>odd,others=>'0');
267 elsif(row>=20 and row<220 and col>=52 and col<308)then
268 roi(1)<='1'; s_ad(1)<=s_ad(1)+1; aivision(1)<=y1;
269 else aivision(1)<=(others=>'0');
270 end if; end if; end if; end process;
271
272 ad_proc:process(clk) begin if(clk'event and clk='1') then
273 lap<='0';
274 case state is
275 when 0=>rd_ad<=(others=>'0'); wr_ad<=(others=>'0');
276 when 2=>wr_ad<=wr_ad+1;
277 when 3=>wr_ad<=(17=>'1',others=>'0');
278 rd_ad<=(17=>'1',others=>'0');
279 when 14|15|16|17=>
280 if(rd_ad=2**18−1)then rd_ad<=(17=>'1', others=>'0');
281 else rd_ad<=rd_ad+1; end if;
282 when 26|27|28|29=>
283 if(wr_ad=2**18−1)then wr_ad<=(17=>'1', others=>'0');lap<='1';
284 else wr_ad<=wr_ad+1; end if;
285 when others=>wr_ad<=wr_ad; rd_ad<=rd_ad;
286 end case; end if; end process;
287
288 fsm_proc:process(clk) begin if(clk'event and clk='1') then
289 start_net<='0';
290 if(reset='1')then state<=0; else
291 case state is
292 when 2=>
293 if(wr_ad=2**18−1)then state<=state+1;else state<=2; end if;
294 when 3=>start_net<='1'; state<=state+1;
295 when 31=>state<=14;
296 when others=>state<=state+1;
297 end case; end if; end if; end process;
298
299 end Behavioral;

What I claim is:

1. An apparatus comprising at least one sensor element, at least one internal element, and a useful output; each said at least one sensor element comprising a first timestamp, a first output coupled to said first timestamp, a first input coupled to the real world, and a sensor threshold, said first timestamp updating responsively to said first input relative to said sensor threshold; said at least one internal element comprising, a second timestamp, a second output coupled to said second timestamp, and a plurality of timestamp inputs, said second timestamp updating responsive to said plurality of timestamp inputs; further coupling each said plurality of timestamp inputs to one of either said first output of said at least one sensor element or to said second output of another said at least one internal element; and generating said useful output signal responsive to at least one said first output or said second output; whereby real world signals enter said apparatus, sensor elements couple to internal elements, and internal elements couple to sensor elements or to other internal elements.

2. An apparatus comprising:
   a. at least one sensor element, each said sensor element comprising:
      i. a first means to store a first timestamp;
      ii. a first output coupled to said first timestamp;
      iii. a first input coupled to the real world;
      iv. a sensor threshold; and
      v. a second means to update said first timestamp responsive to said first input relative to said sensor threshold;
   b. at least one internal element, each said internal element comprising:
      i. a third means to store a second timestamp;
      ii. a second output coupled to said second timestamp;
      iii. a plurality of timestamp inputs; and
      iv. a fourth means to update said second timestamp responsive to said plurality of timestamp inputs;
   c. a fifth means to couple each said plurality of timestamp inputs to one of either said first output of said at least one sensor element or to said second output of another said at least one internal element; and
d. A sixth means to generate at least one useful output signal;

whereby real world signals enter said apparatus, sensor elements couple to internal elements, and internal elements couple to other internal elements.

3. An apparatus according to claim 2, further comprising:
a. at least one analog to digital converter;
b. at least one digital threshold;
c. a digital memory capable of storing data, said data comprising:
   i. a first timestamp number for each said at least one sensor element;
   ii. a second timestamp number for each said at least one internal element; and
   iii. a backward pointing link number for each said plurality of timestamp inputs;
d. a digital data processing unit to read data from said memory, manipulate data, and write data to said memory;
e. wherein said first means is to write said first timestamp number in said memory;
f. wherein said second means is to write a new said first timestamp number to said memory responsive to the output of said at least one analog to digital converter relative to said digital threshold;
g. wherein said third means is to store said second timestamp number in said memory;
h. wherein said fourth means is to write a new said second timestamp number to said memory responsive to said plurality of timestamp inputs;
i. wherein said fifth means is to read said backward pointing link number, and then read an incoming said first timestamp number or said second timestamp number at the memory address indicated by said backward pointing link number; and
j. wherein said sixth means is to generate a signal responsive to at least one said second timestamp number;

whereby said apparatus is made digital.

4. An apparatus according to claim 3, further comprising:
a. a bond number stored in said memory for each of said plurality of timestamp inputs;
b. a seventh means to create said bond number and said backward pointing link number;
c. an eighth means to increase said bond number when learning is to be encouraged;
d. a ninth means to decrease said bond number when learning is to be discouraged; and
e. a tenth means to delete said backward pointing link number and said bond number when bond number decreases beneath a first predetermined threshold;

whereby said apparatus learns.

5. An apparatus according to claim 4, wherein said eighth means, said ninth means, and said tenth means occur only when said backward pointing link number is revisited.

6. An apparatus according to claim 4, wherein said eighth means occur only when said backward pointing link number is revisited and wherein said ninth means and said tenth means occur when said backward pointing link number is revisited and at periodic intervals.

7. An apparatus according to claim 4, wherein said seventh means is to read an address from a history of stored addresses of timestamp numbers that are recently updated.

8. An apparatus according to claim 3, wherein said third means further requires said digital data processing unit periodically reading, decrementing, and writing said first timestamp number or said second timestamp number whereby said first timestamp number or said second timestamp number decays.

9. An apparatus according to claim 2, further comprising:
a. at least one analog to digital converter;
b. at least one digital threshold;
c. a digital memory capable of storing data, said data comprising:
   i. a third timestamp number for each said at least one sensor element;
   ii. a fourth timestamp number for each said at least one internal element;
   iii. a forward pointing link number for each said plurality of timestamp inputs; and
   iv. an accumulator number for each said at least one internal element;
d. a digital data processing unit to read data from said memory, manipulate data, and write data to said memory;
e. wherein said first means is to store said third timestamp number in said memory;
f. wherein said second means is to write a new said third timestamp number to said memory responsive to the output of said analog to digital converter and said digital threshold;
g. wherein said third means is to store said fourth timestamp number in said memory;
h. wherein said fourth means is to write a new said fourth timestamp number to said memory responsive to said plurality of timestamp inputs;
i. wherein said fifth means is to read said forward pointing link number, and then increment said accumulator number at the memory address indicated by said forward pointing link number, and then update said fourth timestamp number if said accumulator number exceeds a second predetermined threshold; and
j. wherein said sixth means is to generate at least one useful signal responsive to at least one said second timestamp number;

whereby said apparatus is made digital.

10. An apparatus according to claim 9, further comprising:
a. a bond number stored in said memory for each of said plurality of timestamp inputs;
b. an eleventh means to create said bond number and said forward pointing link number;
c. a twelfth means to increase said bond number when learning is to be encouraged;
d. a thirteenth means to decrease said bond number when learning is to be discouraged; and
e. a fourteenth means to delete said forward pointing link number and said bond number when bond number decreases beneath a third predetermined threshold;

whereby said apparatus learns.

11. An apparatus according to claim 10, wherein said twelfth means, said thirteenth means, and said fourteenth means occur only when said forward pointing link number is revisited.

12. An apparatus according to claim 10, wherein said twelfth means occur only when said forward pointing link number is revisited and wherein said thirteenth means and said fourteenth means occur when said forward pointing link number is revisited and at periodic intervals.

13. An apparatus according to claim 10, wherein said eleventh means is to read an address from a history of stored addresses of timestamp numbers that are recently updated.

14. An apparatus according to claim 9, wherein said third means further requires said digital data processing unit periodically reading, decrementing, and writing said third timestamp number or said fourth timestamp number whereby said third timestamp number or said fourth timestamp number decays.

15. An apparatus comprising:
   a. at least one sensor element, each said sensor element comprising:
      i. a first means to store a first timestamp;
      ii. a first output coupled to said first timestamp;
      iii. a first input coupled to a pixel of a video frame;
      iv. a second means to update said first timestamp responsive to said first input;
   b. at least one internal element, each said internal element comprising:
      i. a third means to store a second timestamp;
      ii. a second output coupled to said second timestamp;
      iii. a plurality of timestamp inputs; and
      iv. a fourth means to update said second timestamp responsive to said plurality of timestamp inputs;
   c. a fifth means to couple each said plurality of timestamp inputs to one of either said first output of said at least one sensor element or to said second output of another said at least one internal element; and
   d. A sixth means to generate at least one useful output signal;
whereby video frames enter said apparatus, sensor elements couple to internal elements, and internal elements couple to other internal elements.

16. An apparatus according to claim 15, further comprising:
   a. a video analog to digital converter;
   b. a digital memory capable of storing data, said data comprising:
      i. a first timestamp number for each said at least one sensor element;
      ii. a second timestamp number for each said at least one internal element;
      iii. a stored pixel number for each said at least one sensor element; and
      iv. a backward pointing link number for each said plurality of timestamp inputs;
   c. a digital data processing unit to read data from said memory, manipulate data, and write data to said memory;
   d. wherein said stored pixel number is written from said first input;
   e. wherein said first means is to write said first timestamp number in said memory;
   f. wherein said second means is to write a new said first timestamp number to said memory responsive to the output of said first input and said stored pixel number;
   g. wherein said third means is to store said second timestamp number in said memory;
   h. wherein said fourth means is to write a new said second timestamp number to said memory responsive to said plurality of timestamp inputs;
   i. wherein said fifth means is to read said backward pointing link number, and then read an incoming said first timestamp number or said second timestamp number at the memory address indicated by said backward pointing link number; and
   j. wherein said sixth means is to generate a signal responsive to at least one said second timestamp number;
whereby said apparatus is made digital.

17. An apparatus according to claim 16, further comprising:
   a. a bond number stored in said memory for each of said plurality of timestamp inputs;
   b. a seventh means to create said bond number and said backward pointing link number;
   c. an eighth means to increase said bond number when learning is to be encouraged;
   d. a ninth means to decrease said bond number when learning is to be discouraged; and
   e. a tenth means to delete said backward pointing link number and said bond number when bond number decreases beneath a predetermined threshold;
whereby said apparatus learns.

18. An apparatus according to claim 17, wherein said second means further comprises comparing the absolute value of the difference of said first input and said stored pixel number to a fraction of the lesser or said first input and said stored pixel number whereby a temporal edge is calculated.

19. A method comprising, a first group of at least one timestamp, updating each timestamp within said first group responsive to at least one signal input, further comprising a second group of at least one timestamp, updating each timestamp within said second group responsive to any plurality of timestamps from said first or second group, and creating an output signal responsive to any at least one timestamp from said first or second group.

20. A method according to claim 19 further comprising creating links, increasing bonds when links are chronoproximate, decreasing bonds when links are not chronoproximate, and deleting links when bonds are too low.

21. A method according to claim 20 further comprising backward pointing links.

* * * * *